(12) United States Patent  
Jacob et al.

(10) Patent No.: US 7,920,182 B2  
(45) Date of Patent: Apr. 5, 2011

(54) DIGITAL CAMERA WITH NON-UNIFORM IMAGE RESOLUTION

(76) Inventors: Eliezer Jacob, Klryal Thee (IL); Itzhak Pomerantz, Kfar Saba (IL); Gideon Miller, Jerusalem (IL)

( * ) Notice: Subject to any disclaimer, the term of this patent is extended or adjusted under 35 U.S.C. 154(b) by 621 days.

(21) Appl. No.: 11/845,658

(22) Filed: Aug. 27, 2007

(65) Prior Publication Data

US 2008/0088719 A1    Apr. 17, 2008

Related U.S. Application Data

(63) Continuation-in-part of application No. 11/117,731, filed on Apr. 29, 2005.

(60) Provisional application No. 60/823,508, filed on Aug. 25, 2006.

(51) Int. Cl.  
    *H04N 5/217* (2006.01)

(52) U.S. Cl. ........................................ 348/241; 348/294

(58) Field of Classification Search ............... 348/221.1, 348/229.1, 241, 294, 312, 335, 374  
See application file for complete search history.

(56) References Cited

U.S. PATENT DOCUMENTS

| 5,872,572 | A   | * | 2/1999 | Rossignac ..................... 345/428 |
| RE37,282  | E   |   | 7/2001 | Smitt |
| 6,891,169 | B2  | * | 5/2005 | Bukofsky et al. ............. 250/398 |
| 7,408,572 | B2  | * | 8/2008 | Baxter et al. ............. 348/208.14 |
| 2003/0122077 | A1 | * | 7/2003 | Kaufman et al. ............. 250/332 |

* cited by examiner

*Primary Examiner* — Gevell Selby  
(74) *Attorney, Agent, or Firm* — Greenberg Traurig LLP

(57) ABSTRACT

A digital camera includes a sensor adapted to provide a digital representation of a portion of a field of view and an optical system that causes a plurality of locations within the field of view to become incident on the sensor. A pixel correction module adds a bias value to any pixel within the digital representation of a portion of a field of view and multiplies it by a gain factor. A region-of-interest lookup table stores sets of values, each set related to a rectangular region of interest within the field of view. The stored values include bias and gain factors.

18 Claims, 15 Drawing Sheets

| Sector No. | From azimuth° | To Azimuth° | Speed Degrees/ second | Sweeps Count | Dwell Seconds |
|---|---|---|---|---|---|
| 1 | 200 | 340 | 20 | 1 | 7 |
| 2 | 200 | 240 | 40 | 1 | 1 |
| 3 | 240 | 260 | 20 | 6 | 6 |
| 4 | 260 | 340 | 40 | 1 | 2 |

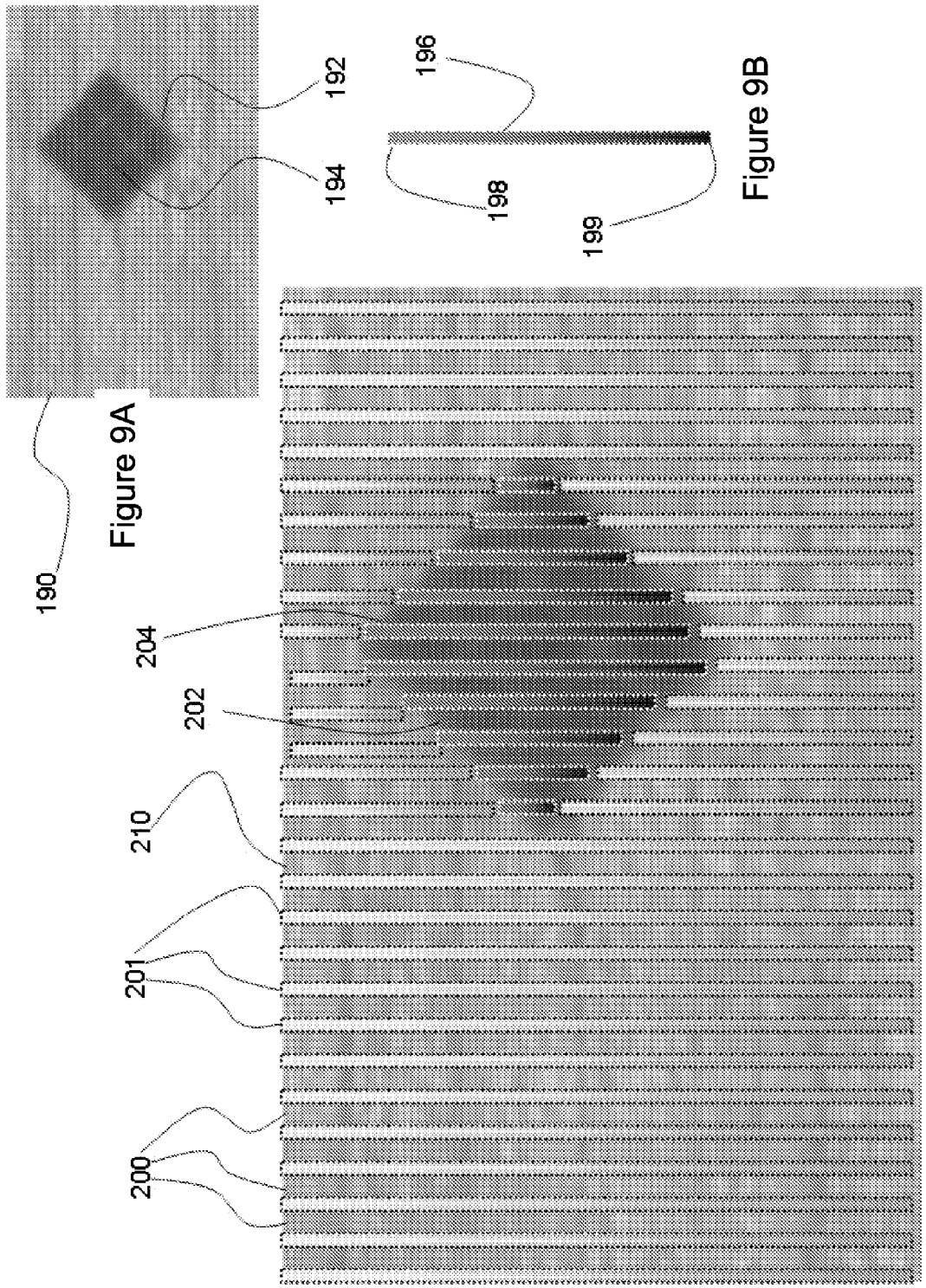

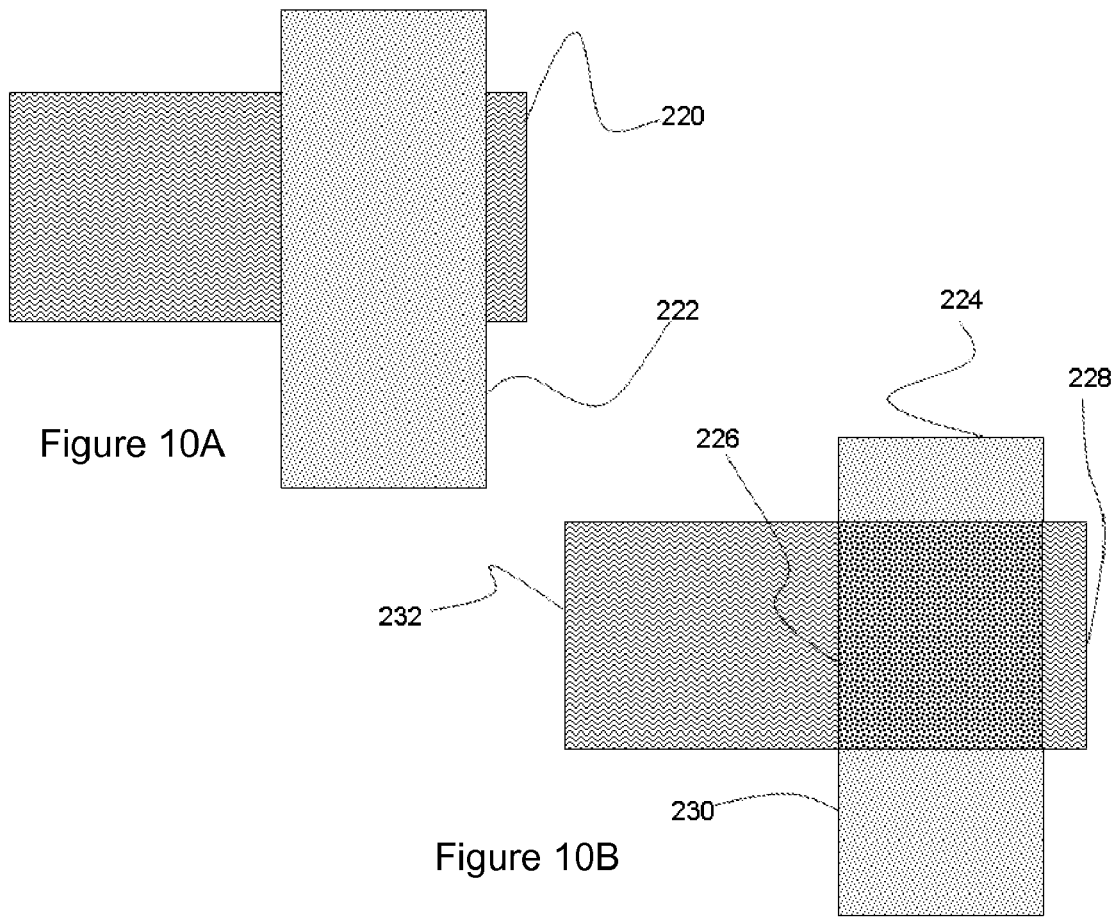

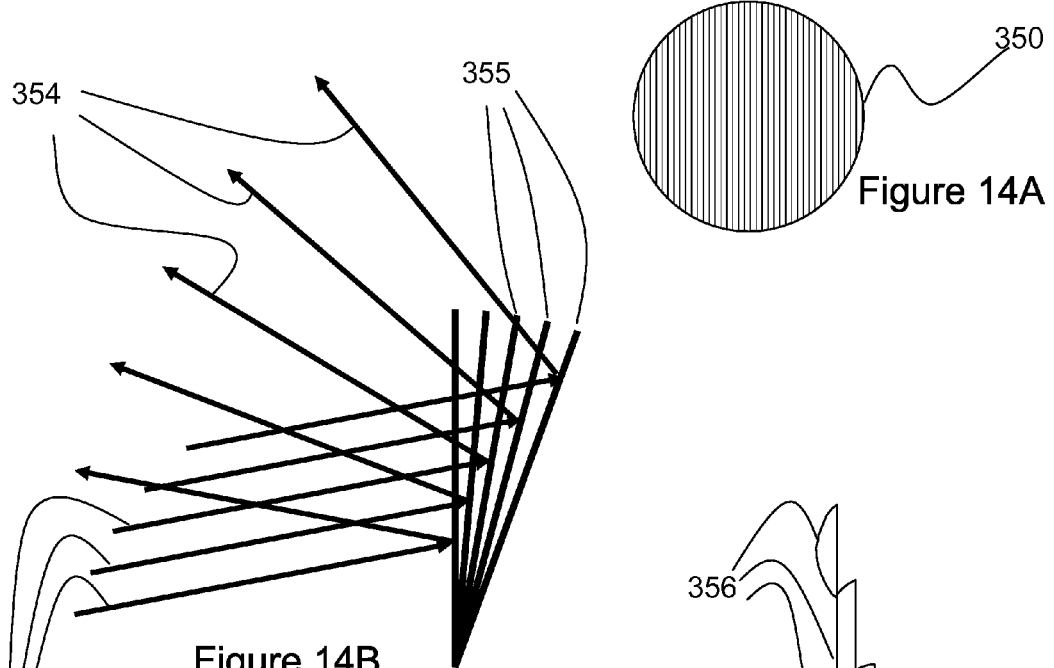
Figure 14A
Figure 14B
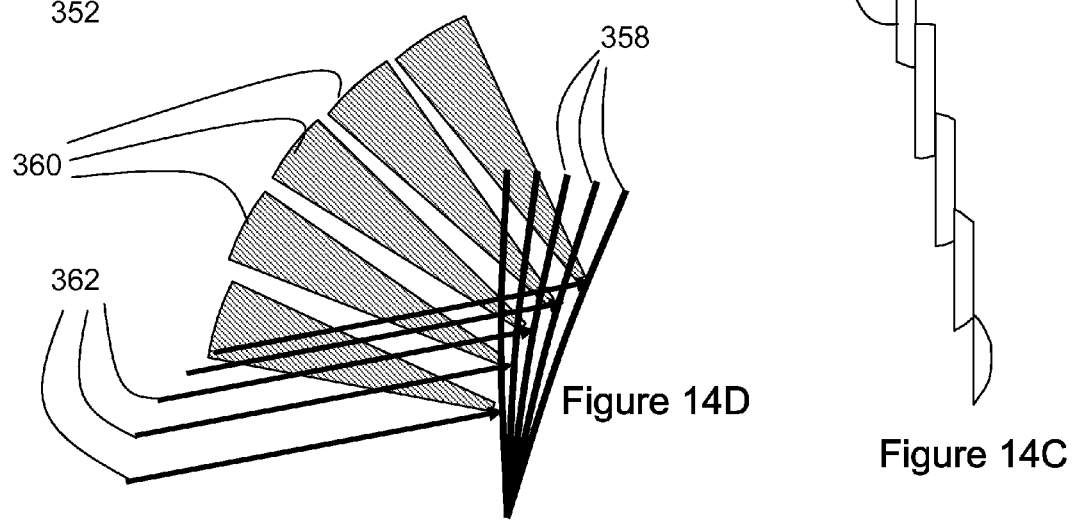
Figure 14C
Figure 14D
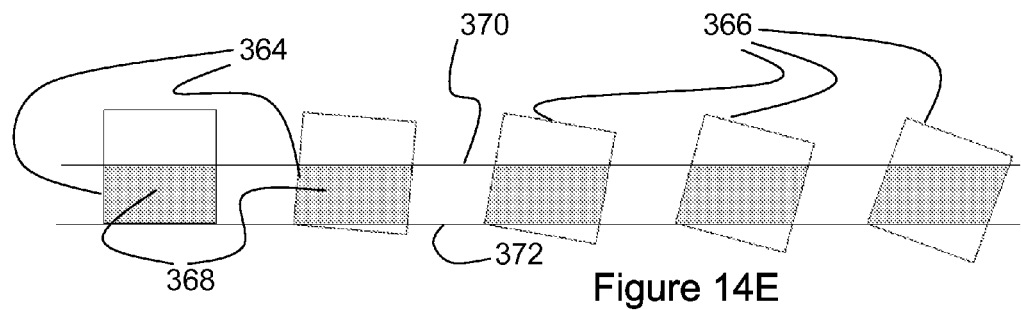
Figure 14E

DIGITAL CAMERA WITH NON-UNIFORM IMAGE RESOLUTION

This application claims priority to U.S. Provisional Patent Application Ser. No. 60/823,508, filed Aug. 25, 2006, which is incorporated herein by reference in its entirety. This application is a continuation-in-part of U.S. patent application Ser. No. 11/117,731 filed Apr. 29, 2005, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of digital imaging, and in particular to digital cameras for capturing a scene in a given field of view.

BACKGROUND OF THE INVENTION

The present invention is directed to improved modes of utilization of the programmable resolution scanning camera disclosed in U.S. patent application Ser. No. 11/117,731 filed Apr. 29, 2005. The invention described therein in one embodiment provided a system for isolating digital data representative of portions of a field of view. The system includes an array of sensor cells adapted to provide digital representations corresponding to at least a portion of the field of view, and a selector adapted to isolate a non-uniformly distributed subset of the digital representations provided by the array. A buffer is provided for holding the isolated digital representations. The system may have an asymmetric distribution of active pixels in a frame, and the distribution of active pixels in a frame may be non-contiguous and/or programmable.

In other aspects the system according to U.S. patent application Ser. No. 11/117,731 provided for isolating digital data representative of parts of a field of view that change over time. The system includes an array of sensor cells which provide a plurality of digital representations corresponding to at least a portion of the field of view at a given moment in time and a selector for isolating a non-uniformly distributed subset of the plurality of the digital representations provided by the array at a given moment in time, the isolation being performed based upon a set of values programmed in a programmable lookup table.

U.S. patent application Ser. No. 11/117,731 also disclosed a method of acquiring a digital image with a non-uniform resolution, including the steps of providing an array having uniformly spaced photoelectric sensor cells, exposing the array, causing the array to provide a digital representation for each of the uniformly spaced photoelectric sensor cells, and selecting from a first region of the array a first subset of the digital representations for the sensor cells within the first region, the first subset having a first average resolution over the first region that is less than the maximum resolution. A second subset of the digital representations for the sensor cells within a second region of the array is then selected, the second subset having a second average resolution over the second region.

OBJECTS AND SUMMARY OF THE INVENTION

The camera described in U.S. patent application Ser. No. 11/117,731, and/or certain applications and uses of that camera, can benefit from the following methods and systems:

A method of compensation for uneven sensitivity of individual cells in the CCD array (by horizontal histogramming and equalizing pixels to the average of their neighbors).

A method of compensation for uneven illumination conditions in different azimuths in the field of view (by varying the mirror scanning speed and the CCD integration time).

A method for high precision zooming on critical spots for train safety applications (By using the deterministic trajectories of trains for extremely narrow zooming).

A method for continuous increase of resolution in the process of homing on small moving targets (by narrowing the scanning angle and moving from unidirectional scan to sector scan and finally to vibration of the mirror about the target).

A method for precise tracking of a moving target (By combined vibration and slew of the mirror).

A method for calibration of the CCD cells within a zoom window using extra-window information (By extrapolating the behavior of the same cells outside the window).

Automatic increase of the duty cycle of coverage of the mirror, when the camera is zooming on a narrow field of view (By switching from unidirectional scan to a sector scan around the target).

Methods to increase the duty cycle coverage on high interest targets (by modulation of the mirror rotation speed to vary the azimuth resolution to angles of interest).

Automatic adjustment of the dynamic range of the camera (bias and gain) to accommodate bright and dark areas in the field of view (by identifying dark and bright areas in the field of view and tuning the lookup table to vary the gain and bias between them).

Methods for varying scanning rates and integration times during the scan to compensate for high and low illumination areas within the field of view.

Handling overlapping windows that require different parameters programmed into the lookup table by converting two overlapping rectangles into multiple non overlapping rectangles.

Economic methods for aerial photography with horizon to horizon coverage (by using a rotating mirror with an axis parallel to the direction of flight).

Extending the depth of field, to low altitude wide angle aerial photography (by using extra resolution in the near field and deblurring the image by binning).

Extracting several, horizontally overlapping zoom windows, simultaneously without slowing down the processing and the mirror rotation speed.

Optically isolating the imaging sensor from the illumination source (by packaging the illuminator and the imager in difference cases).

Creating a laser illumination blade (by converting a round beam to a blade beam using a piecewise twisted mirror).

Close-loop tracking between the illumination beam and the imaging beam (by slanting one of the beams and converting an angular difference between the beam into a detectable change in brightness).

Increasing the accuracy of detection of moving targets (by applying a built-in video motion detection in the camera for iterative resolution enhancement).

Instant detection of moving targets (by detection of jaggedness in object contour due to interlaced scanning).

Correction of shape distortion of moving targets (by averaging the shape of the object between two co-located cameras, scanning in opposite directions).

Handling multiple overlapping regions of interest (by using multiple diluting units in parallel).

Accelerating the dilution process (by segmenting the linear array and processing each segment in parallel).

Delivering an instant stereoscopic image (by using two close cameras).

In one embodiment, the invention provides a digital camera that includes a sensor adapted to provide a digital representation of a portion of a field of view and an optical system that causes a plurality of locations within the field of view to become incident on the sensor. A pixel correction module adds a bias value to any pixel within the digital representation of a portion of a field of view and multiplies it by a gain factor. A region-of-interest lookup table stores sets of values, each set related to a rectangular region of interest within the field of view. The stored values include bias and gain factors.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 9 show comparative results of dynamic range compression by regional signal adjustments.

FIG. 10 illustrate the conversion of overlapping rectangles to non overlapping rectangles.

FIG. 14 shows schematically the generation of an illumination blade from a round laser beam.

DETAILED DESCRIPTION OF THE PREFERRED EMBODIMENT

Reference will now be made in detail to the preferred embodiments of the present invention, examples of which are illustrated in the accompanying drawings.

The present invention is described below with reference to block diagrams and operational illustrations of methods and devices to acquire and/or isolate digital data. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
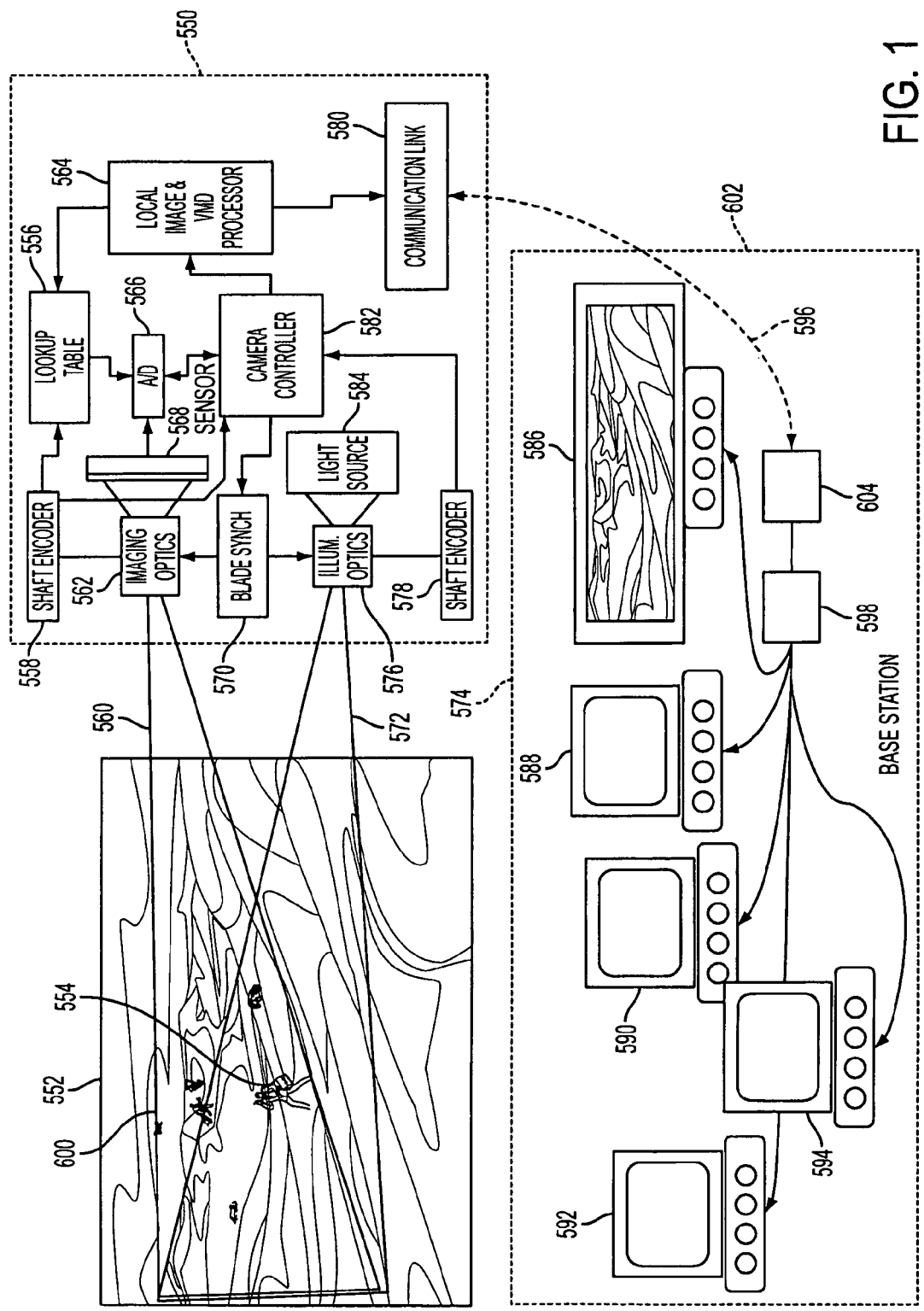
FIG. 1 is a simplified block diagram of a system that incorporates one embodiment of the invention.

FIG. 1 shows, by a simplified block diagram, a typical image acquisition system according to the present invention. Its operation will now be explained in broad terms, deferring detailed explanation, in conjunction with specific components, to the sequel.

A scene 552 is covered by a camera 550. A more detailed description of key blocks of one embodiment of the camera 550 is presented in FIG. 17. Returning to FIG. 1, a linear sensor array 568, such as a linear CCD, covers, at any instant, a very narrow stripe 600 (called hereinbelow "imaging blade") of the scene, imaged on it by an optical subsystem 562 such as a combination of a rotating mirror and a camera lens. The precise azimuth of the imaging blade is sensed by a shaft encoder 558 and is referred against a Lookup Table 556 that indicates the information that the system needs from the camera at this azimuth. The azimuth is also read into a camera controller 582.

Optionally, a light source 584 such as an array of laser diodes and an array of deflecting mirrors, is generating a very narrow illumination beam 572 (hereinbelow "illumination blade") that is projected by an optical system 576 onto the scene. It should be noted that while this figure shows an angular difference between the two blades 572 and 600—they are preferably designed to come from very close locations, to coincide at the scene and to track each other very closely. A precise shaft encoder (578) tracks the position of the illumination blade and reports it to the camera controller (582). One way to synchronize between the two blades is to determine, by image processing, any deviation of the illumination blade from the imaging blade, and command a blade synch mechanism 570 to modify the angle between the two optical systems 562 and 576 to align the two blades to cover the same direction.

The signals from the sensors array are converted to a digital representation by an analog to digital converter within block 566 and are then diluted or otherwise filtered or modified according to parameters read from a look-up table 556, specifically for various regions of interest by an image processor within block 566. The camera controller 582 reconstructs an image from the digital representation of a sequence of proximate imaging blade (or scanning—) positions, and sends the image to a local image—and video motion detection VMD processor 564, that compares the image to previous images and identifies areas where motion seems to have occurred, using standard methods of video motion detection well known in the art. When an area of suspected motion is detected, the local image processor 564 modifies the scanning schedule by updating the Lookup Table 556 so as to scan the image with a finer imaging blade in areas of suspected motion and thus increase the resolution there. The resolution is increased until it is enough to make a dependable decision about moving targets within the suspected area of the image.

Similarly, the Lookup Table 556 can be updated so as to vary the scanning speed, for example increasing the speed of repeated scans across the area of suspected motion so as to increase the number of images per second available for motion analysis.

The reconstructed image is continuously communicated via a communication interface 580, a communication link 596 and a remote communication interface 604, to a base station 602 for remote monitoring. There, the image is further processed, by digital processor 598 resulting in a panoramic display 586 and a plurality of zoom displays 588, 594, 592 and 590 displaying images of the scene. Operators analyze the scene and report targets 554. The operators can also remotely modify the scanning parameters of the camera by modifying the content of the lookup table 556.

The advantage of splitting the image processing between fast local processor 564 and remote strong processor is in closing the control loop over the parameters of scanning without the inherent delay of the communication line. The quality of the video that is communicated over the expensive and necessarily bandwidth-limited communication line is enhanced by this method of processing.

Figure 2:
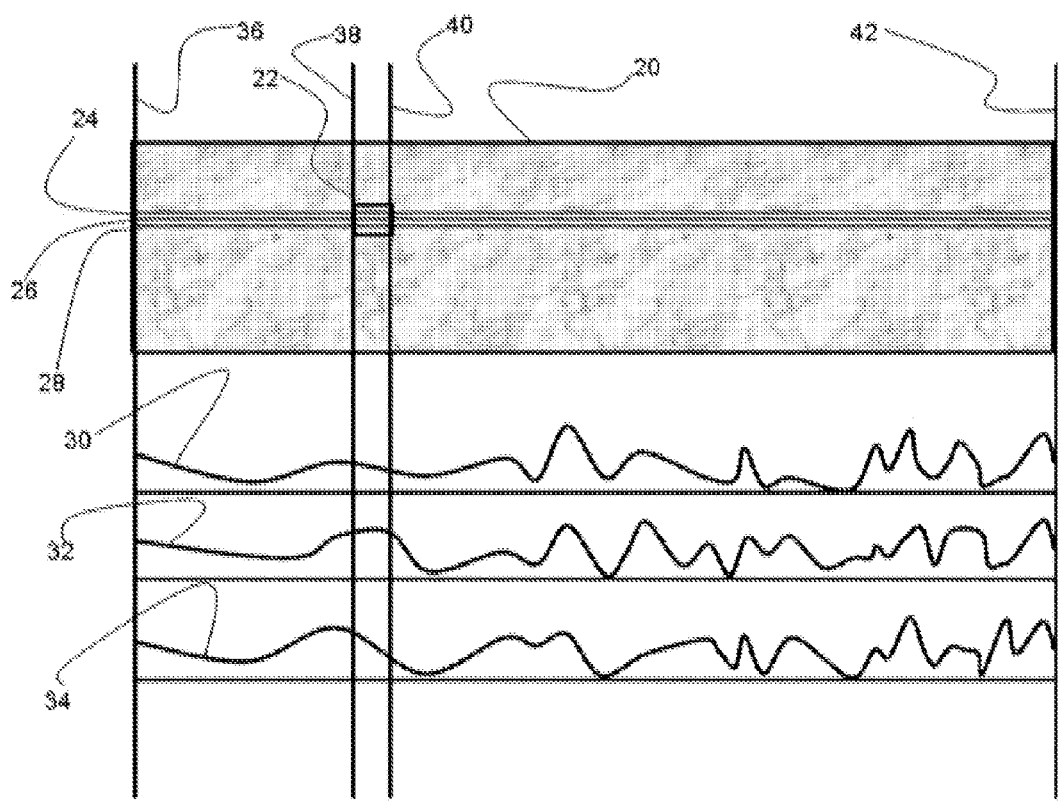
FIG. 2 illustrates the calibration of CCD cells.
Figure 3:
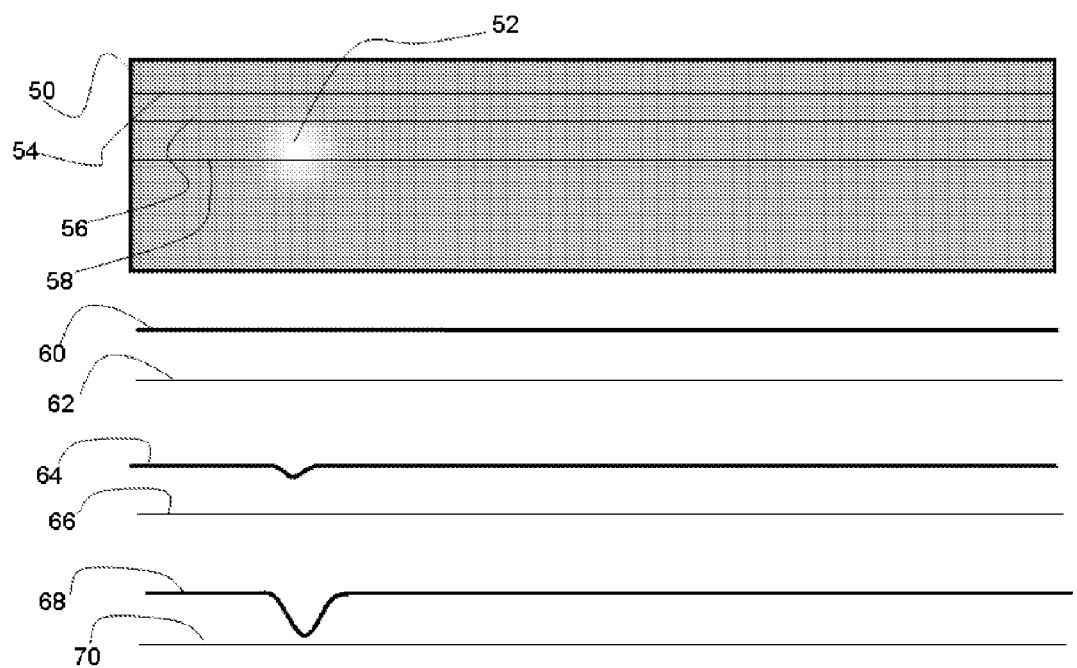
FIG. 3 shows a field of view with a strong light source.

Attention is now drawn to FIGS. 2 and 3. It will be noted that when scanning a field of view, it may be beneficial to adjust for sensitivity variations among individual sensor cells. It may even be beneficial to perform such adjustments dynamically, so that adjustment parameters of a given cell may be made to be different in one area of the field of view than in another.

There may be several reasons for wanting to compensate for the sensitivity of individual sensor cells, or groups of cells, and to adjust subsequent signal intensity; these include, for example:

a. Non uniformity within the CCD array, due to imprecision during CCD production.

b. Gain non-uniformity among the signal readout and amplification channels. For example, when odd and even pixels and/or lines are interlaced, each of the two groups travels through a different analog channel.

c. Non uniform illumination over the field of view. For example, in a typical outdoor field of view, there is often more light in the sky area and less light on the ground.

d. CCD arrays are known to respond to saturating light by blooming (overflowing into neighboring cells); it is therefore useful to avoid, or compensate for, such blooming when particular cells are expected to be flooded with strong light.

It should be noted that unlike ordinary cameras, where the photographic images are typically taken for aesthetic or artistic purposes and where, therefore, maximum authenticity (including realistic shades of light and darkness) is desired, the camera of the present invention will often be used for informative purposes only (for example in automatic surveillance or automated inspection applications). In such information-driven applications, automatic sensitivity control that maximizes dynamic range, at the expense of realistic gradations, is preferred.

In one embodiment, the lookup table 556 (FIG. 1) is populated with signal adjustment parameters (as discussed above) and scan parameters, in addition to dilution parameters. Since every pixel area in the field-of-view is represented in the lookup table, each pixel area can be optimized as it is being scanned, by using the appropriate scan parameters and/or signal adjustment values stored in the lookup table entry that corresponds to that pixel area. Thus a single lookup table entry can indicate, for example:

whether a given scan line should be acquired at all, the addresses of any pixels or groups of adjacent pixels that should be acquired within that scan line (if any), the dilution factor and mode that will be applied to each group of pixels, if relevant, and—analog and digital adjustment parameters that should be applied to each pixel or group of pixels.

The parameters may be stored in the lookup table for each pixel, or for a group of adjacent pixels in the case that such a group shares common parameters. In particular, a group of adjacent pixels may be defined as a rectangular region of interest (ROI) and parameters may then be stored in the lookup table in terms of such regions of interest (ROI)—a group of parameter values for each ROI. Specifically there may, in general, be stored for each region its azimuth range, its elevation range, the horizontal—and vertical dilution parameters, scan parameters (which may include the time between successive signal extractions, scan velocity and the number of times the region is to be scanned before moving on to the next region), and parameters related to signal compensation in that region, namely gain and offset. In certain configurations there may also be stored in the lookup table a scanning schedule, as further explained below.

The system may define the ROIs and determine, for each ROI, the various parameters stored in the lookup table, based on information obtained by processing images acquired at previous scans. Storing data in the lookup table thus grouped by ROIs, rather than by individual scan lines (image blades), is compact.

In certain configurations of the invention, such as illustrated herein, a single lookup table is used to store pixel dilution parameters, scan parameters and signal adjustment values. In other configurations, there may be separate lookup tables for any of the various parameter types.

The CCD cells can be calibrated in the production facility, and the resultant compensation parameters—mainly the bias and gain for each cell—can be provided as a digital file that is delivered with each CCD array. The camera controller can then feed the data into a special calibration lookup table or, in certain configurations, combine them with adjustment parameters stored in the ROI lookup table 556. In any case, these calibration parameters are used to continuously correct the digital pixel values obtained during scanning.

The CCD may also be calibrated while in the camera by imaging two or more test targets, with different but uniform gray levels and using the output of all the sensor cells to calculate a calibration table, assigning to each cell bias and gain parameters that make their response uniform (using, for example, a successive approximation algorithm). The resultant calibration function may be linear or of higher degree.

In another embodiment, the calibration can be done and dynamically updated, based on statistical assumptions. For example, it may be assumed that the average output of a given cell across the broad field of view of the camera, should be very similar to the average of the neighboring cells (the one or two above and the one or two below this cell)—as the density of the cells is high enough, and the images are random enough, to ensure high correlation between the output of adjacent cells. Using this assumption one can calibrate parameters, such as bias and gain of a cell to meet the average between its neighbors at 2-3 instances during the day, under different light conditions. In this embodiment for example, an image can be taken at sunrise, then at midday, and then again at sunset. In all three images, the average output of a given cell is compared to the average of its neighbors. The bias and gain of this cell will be calculated based on the three images, giving at least three equations in two variables—enough to estimate the variables and the quality of the calibration. It is a unique feature of scanning cameras with very high zooming—where most of the field of view is outside of the zoom window—that while parts of the field of view may be considered of relatively low interest and therefore be excluded from the zooms, —is the entire field of view is always available to be covered and used for calibration of the cells, towards their entry into the zoom window. (See FIG. 2). It can be noted that this calibration approach is not limited to using the sun. For example, in indoor applications a similar process can be applied by using lighter and darker segments of the field of view.

FIG. 2 schematically illustrates the calibration of a CCD cell based on its neighbors.

A broad field of view 20 extending from a left end 36 to a right end 42 is covered by a camera described herein. Each cell of the CCD, such as 26 and its upper neighbor 24 and its lower neighbor 28 are covering, each, a horizontal line across the field of view. A small zoom window 22 extends between a left end 38 and a right end 40. The present invention assumes that the average amount of light 32 seen along line 26 at a given time, is very similar to the amount of light 30 and 34 seen along lines 24 and 28, so that if the three corresponding cells of the CCD had identical parameters, then the average amount of light reported by the three cells would be equal. It should be noted that the three cells may not have identical output in the small zoom window 22 due to local differences—but these differences are likely to be averaged out across the whole field of view.

Setting the parameters of cell 26 to be the average of 24 and 28 cannot be done based on this calculation, as the cell performance is characterized by at least two parameters—gain and bias, and the result of a single measurement cannot distinguish between the two parameters. However, if the same test is repeated at different conditions of light—such as dawn, sunset and mid day, then the bias and gain of the cell can be calculated by solving few equations with these two variables.

In this embodiment, the bias and gain parameters of a cell are calculated from the comparison of the average output of the cell to its neighbors at several light conditions during the day. The advantage of this method is that it can be done in the field, automatically and periodically.

In another embodiment, the lookup table can be programmed to attenuate the gain of a cell immediately prior to its getting a strong light beam, and resuming its sensitivity after passing the light source. This can be useful for example, when the camera is fixed and the strong sources of light in the field of view are also fixed (such as a stationary camera covering a field of view that includes the sun).

The information about the location of strong light sources can be either programmed in advance from external sources of information, or automatically detected by making a preliminary scan of the camera in low sensitivity, or based on ongoing analysis of prior scans.

FIG. 3 shows a field of view 50 of a camera and three lines of scan 54, 56 and 58 representing the scan lines of three cells in the linear CCD array. Illustrating a possible typical scene, a strong light source 52 is present at a certain azimuth and elevation within the field of view.

Line 54 does not cross the strong light source, and its sensitivity, rendered as line 60 over reference 62 is maintained constant.

Line 56 is passing near light source 54 but does not cross its peak, so its sensitivity 64 over reference line 66 is partially reduced.

Line 58 is passing through the peak of the light source, and its sensitivity 68 over reference line 70 is therefore reduced much more and for a longer sector.

A camera that has the sensitivity adjusted thus is less sensitive to blooming than a camera that maintains uniform sensitivity across the field of view.

In another preferred embodiment, blooming can be addressed by reducing the integration time over areas of stronger light. For example, in the case of a TDI sensor sensitivity can be reduced by reducing the number of TDI lines accumulated or in the case of a non-TDI sensor—by increasing the scan rate in areas subject to blooming.

Figure 4A:
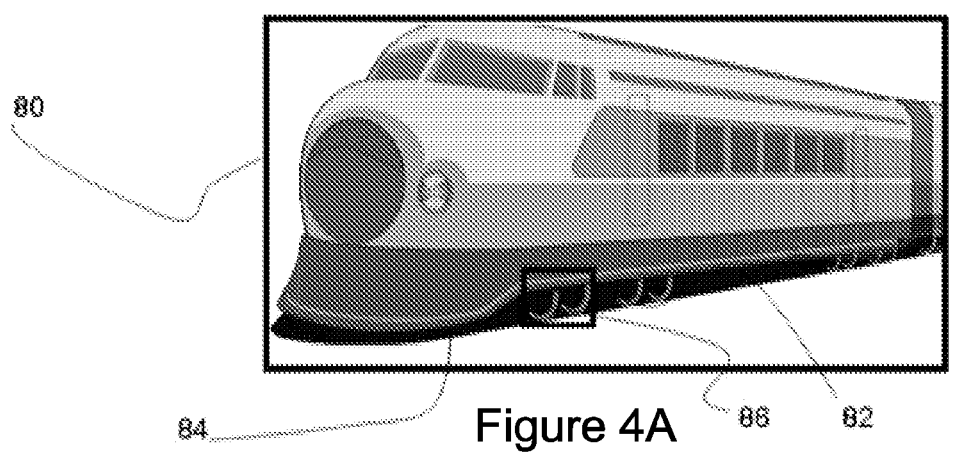
FIG. 4 show a zoom window covering an area in a train monitoring scenario.
Figure 4B:
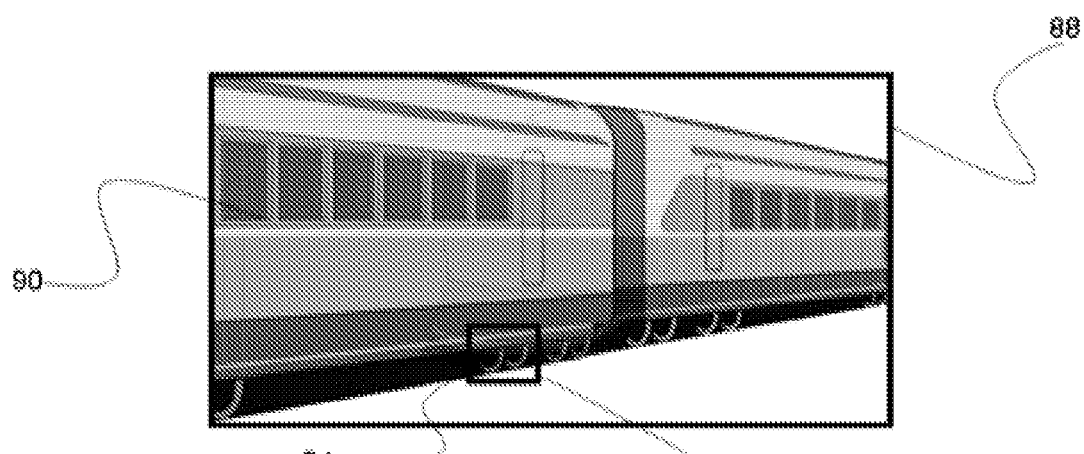

Attention is now drawn to FIGS. 4A-4B. In one embodiment, the camera is fixed and covers a train traffic area, for the purpose of monitoring specific safety aspects of the train activity. As trains move on very deterministic and repetitive tracks, the zooming feature of the camera is applied to create a number of very high zoom, very narrow sectors for coverage. An example would be the need to look at the mechanisms that pull the rails for changing the routes of the train. The fixed, detailed zoom enables the camera to give a very economic and detailed coverage of areas related to train trajectories.

While prior art telescopic cameras can also be directed at a very precise and stable direction to cover a repetitive event that always happen at the same direction—the presently disclosed camera is unique in its ability to cover multiple events, at directions, with a single camera and locally track each event—even if the motion of each event is at a different direction.

FIGS. 4 and 4B show the application of the presently disclosed camera for monitoring of highly zoomed elements in train transportation monitoring.

A field of view 80 covers a track 82 and a train. A narrow Zoom window 86 is defined so that the wheels of the locomotive 84 will be well covered.

FIG. 4B shows the same field of view 88 and zoom window 92 as the train 90 moves on. Due to the precise position of the train on the track, the same window 92 will continue to cover the wheels 94 of the other cars of the train. In more general terms—the precise position of trains on their tracks enables, in one embodiment, a single camera to cover a plurality of small elements of the passing trains with very narrow zoom windows. Similar coverage may be possible in specific road, air, and marine traffic applications in situations where vehicles can be expected to pass, or caused to pass, within a narrow predefined field of view (such as through a gate, ramp, slipway, or other constrained passageway). Such coverage is of course not possible in other road, air and marine traffic, where the vehicles have wide tolerances around their planned path.

Attention is now drawn to FIGS. 5A-5D. In one embodiment, the camera has means for measuring visual parameters of a known object in a ballistic trajectory. The camera can acquire the following parameters from a single scan of the object: a. The azimuth to the object. b. The elevation of the object. c. The tangential speed of the object. d. The orientation in space of the object. e. The acceleration of the object.

These parameters can be acquired from a series of scans to increase the reliability and accuracy of the acquisition. In this embodiment, the camera disclosed herein can provide information for extrapolating the trajectory and determining the expected time and location the ballistic object, for example for guidance for systems designed to hit that object. If the trajectory of the ballistic object, when viewed from the camera, has a relatively tall trajectory and a relatively narrow horizontal sector of approach, the camera can be positioned with a horizontal mirror and provide a narrow and tall coverage.

FIGS. 5A-5D show how the disclosed camera can be used to detect the direction of tangential motion of a moving object in one scan.

Figure 5A:
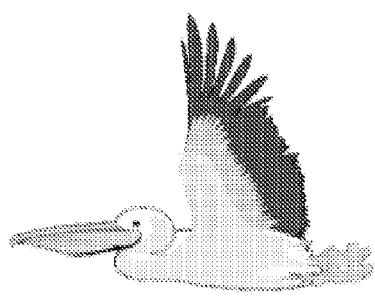
FIG. 5 show a moving object in different directions.

FIG. 5A is a reference illustration of a static object as captured by the camera, where the mirror scans the field of view from right to left.

Figure 5B:
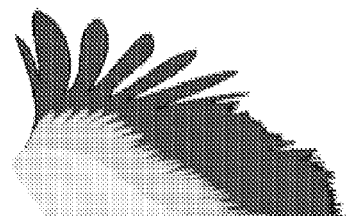

FIG. 5B shows the way that the same object will be captured by the camera if it is moving from right to left. During the time that the camera scans the object from its right end to its left end, the object changes its position leftwards. When the camera reaches the left end of the object, the object has already moved to the left, and the image of the object will appear to be longer than its real size. The vertical size of the object will not be affected by its motion, and therefore if the object is captured with high enough resolution and if the proportions of the objects are known a-priori (such as a moving car or an airplane)—the direction of motion and an estimate of the tangential speed can be derived. (It should be remembered that the scanning speed of the mirror is itself known to the system at all times).

Figure 5C:
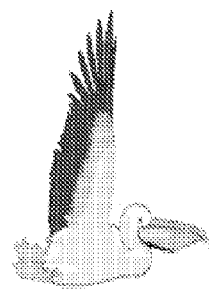

FIG. 5C shows the way that the same object will be captured by the disclosed camera if it is moving from left to right. During the time that the camera scans the object from its right end to its left end, the object changes its position rightwards. When the camera reaches the left end of the object, the object has already moved to the right, and the image of the object will appear to be shorter than its real size. The vertical size of the object will not be affected by its motion, and therefore if the object is captured with a good enough resolution and if the proportions of the objects are known a-priori (such as a moving car or an airplane)—the direction of motion and an estimate of the tangential speed can be derived.

Figure 5D:
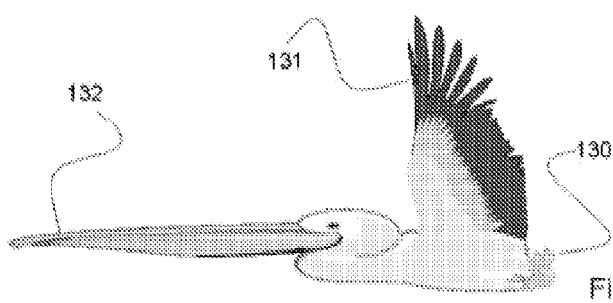

FIG. 5D shows an image of the same object, where the right side 130 is shrunk in comparison with the stationary object of FIG. 5A, the central part 131 is of the same scale as the stationary object, and the left side 132 is stretched in comparison with the stationary object. This distorted image is an indication that the object has been increasing its speed leftwards while the camera was scanning it from right to left. This illustration indicates that a method of using the presently disclosed camera as an indicator of acceleration of objects in a single scan, by segmenting the image of the object into horizontal segments and analyzing the individual horizontal scale of each segment, and accounting for the direction and speed of scan of the mirror.

Attention is now drawn to FIGS. 6A-6E. In an embodiment, a small moving target is covered by a sector scan of the mirror about it. By a sector scan, the presently disclosed camera scans the target in both directions alternately, and in doing so, it alternates between a scan in which the target is enlarged (when the rotation is in the same direction of the tangential speed of the target) and shrunk (when the rotation is against the direction of the tangential speed of the target). Averaging between the two apparent lengths of the target gives an accurate estimate of its real size at rest, while calculating the deviation between the two apparent lengths gives an estimate of the tangential speed of the target. A sector scan, thus adds important information about the target while improving the duty cycle of coverage. If the object is recognizable, then the apparent size can be computationally converted to the distance to the target, and knowing the distance—the apparent tangential speed can be computationally converted to the real cross speed of the target. Clearly, the temporal deviation in distance, can easily be converted to a closing speed, and the two speeds can be computationally converted to real ground speed.

Figure 6C:
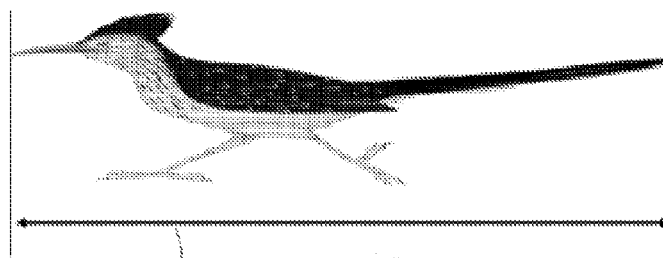
FIG. 6 illustrate speed measurement by a bi-directional scan.
Figure 6D:
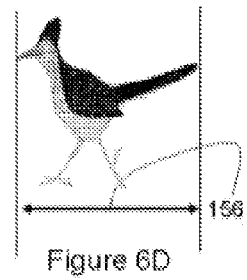
Figure 6E:
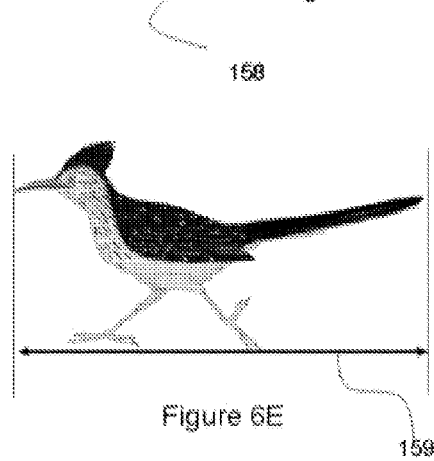
Figures 6A, 6B:
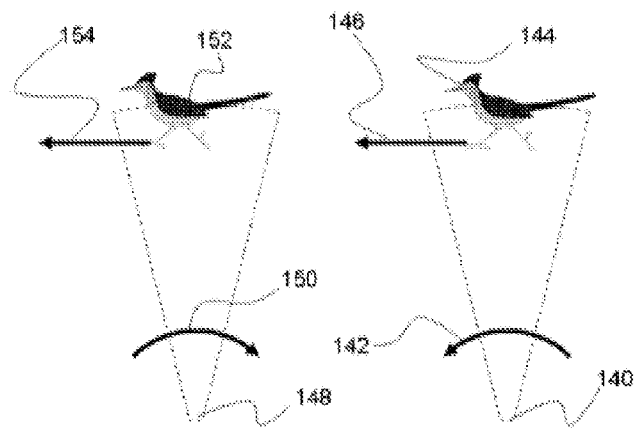

FIGS. 6A-6E illustrate a method of estimating the tangential speed of a target using the sector scan mode of the present invention. FIG. 6A shows a left moving 146 object 144 being imaged by the camera 140 with its mirror moving 142 right to left. FIG. 6B shows the same moving 154 object 152 imaged with the same camera 148, with its mirror moving 150 left to right. As was explained in FIG. 5, the object will be stretched in the case of 6A and will look as in FIG. 6C, and will be shrunk in the case of 6B and will look as in FIG. 6D. The two apparent lengths of the object, 156 and 158, can be used to calculate the length 159 of the object (by averaging them) and the speed of the object (by subtracting them).

If the actual length (in centimeters) of the object is known, then the distance to the object can be calculated from its angular dimensions.

FIGS. 7A-7D show some important aspects of the non uniform scanning of the present invention, designed to accommodate non-uniform level of interest and non uniform requirement for sensitivity.

Figure 7A:
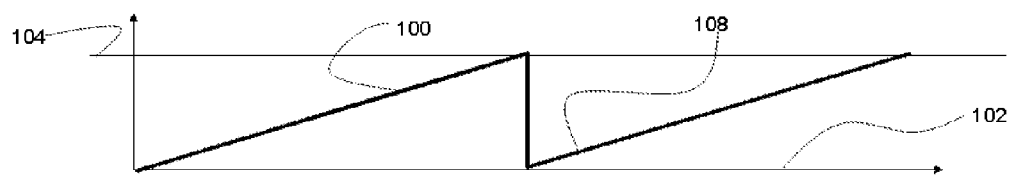
FIG. 7 show graphs of various schedules of scanning, illustrating variable velocity and multiple sector scans.
Figure 7B:
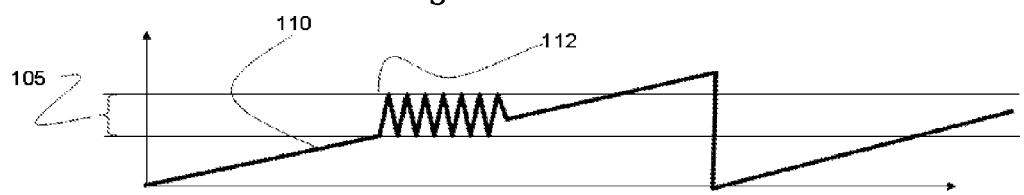
Figure 7C:
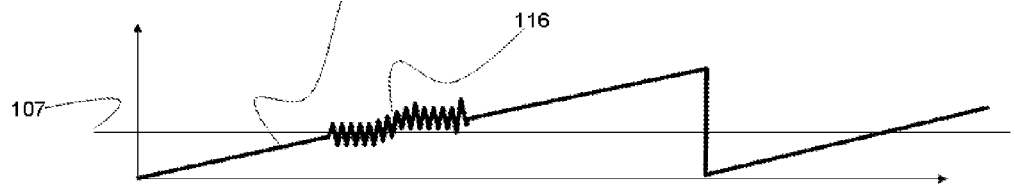

Attention is now drawn to FIGS. 7A, 7B, and 7C. In an embodiment of this invention, the camera can gradually scale up a target in the field of view while increasing the duty cycle of its coverage, by, upon detection of a target, switching the mirror rotation from unidirectional rotation into a sector scan about the target area comprising rapid alternation of the direction of rotation so as to have the effect of the mirror sweeping rapidly backwards and forwards over the target, and then to changing the direction of rotation so rapidly as to have the effect of "vibrating" the mirror backwards and forwards across the target itself. As the shaft encoder is preferably connected to the mirror and therefore reports accurately the precise angle of the mirror, such modifications of mirror rotation do not harm the accuracy of the system.

FIGS. 7A, 7B and 7C show three modes of scanning by the mirror in the presently disclosed camera in accordance with one embodiment.

FIG. 7A shows a unidirectional scan of where line 102 represents an azimuth of 0 degrees and line 104 represents an azimuth of 360 degrees which is the same azimuth. The mirror scans at constant angular speed where 100 represents one revolution and 108 represents the next revolution.

FIG. 7B represents a sector scan of the mirror of a camera of the present invention over an azimuth sector 105. The scan line 110 goes in one direction until it reaches the beginning of sector 105, and then repeatedly rotates over this sector back and forth for a while, before continuing a unidirectional scan.

This mode of operation enables the camera to cover a sector of interest with very fast revisit time, in comparison to a wide unidirectional scan where a full revolution may take place before the mirror revisits a given target.

FIG. 7C shows an even more focused scan, useful in tracking a single target. In this mode, the camera scans 114 in one direction until it detects an interesting target in azimuth 107. If the system needs to track the target, it modifies the rotation of the mirror such that it rapidly alternates the direction of rotation providing an effect that resembles a "vibration" of the mirror in a narrow sector about the target at a relatively high frequency. The vibration pattern is characterized by three parameters that can be adjusted to optimize the coverage of the target. (this motion is termed "vibration" for convenience, but it should be noted that it is a rotation in rapidly alternating directions about the axis of the mirror) The center of the vibration range can be adjusted to follow the center of the tracked target, and if the target is moving, so can the center of the vibration range.

The amplitude of the vibration can be adjusted to the width of the target, so that all of the "Attention" of the camera is dedicated to the target. Clearly, the vertical dilution can be adjusted to cover the height of the target, so that the camera is zoomed on the target in both dimensions.

The frequency of the vibrating can be adjusted to meet the mechanical imitations of the camera.

The "vibrating" of the mirror around the image when the CCD is diluted can enhance the quality of the image, as the camera can diversify the selection of active pixels in the dilution, and have the image integrated in a much higher resolution than when scanning the target once.

In an embodiment of the present invention the camera varies the speed of rotation of the mirror in accordance with the level of interest associated with every azimuth, so that sectors that need higher sensitivity will be scanned more slowly and with increased time of integration.

The camera may vary the speed and direction of mirror rotation of scan based on, for example, the level of interest of the user in different parts of the field of view. Varying the scan rate can be useful, for example if using a CCD that has a relatively low read-out rate. In this case, more "interesting" areas of the field of view can be scanned at lower speed thereby can enjoying higher density of pixels and better performance. As can a very narrow sector that is scanned at high speed during the "vibration" mode.

Figure 7D:
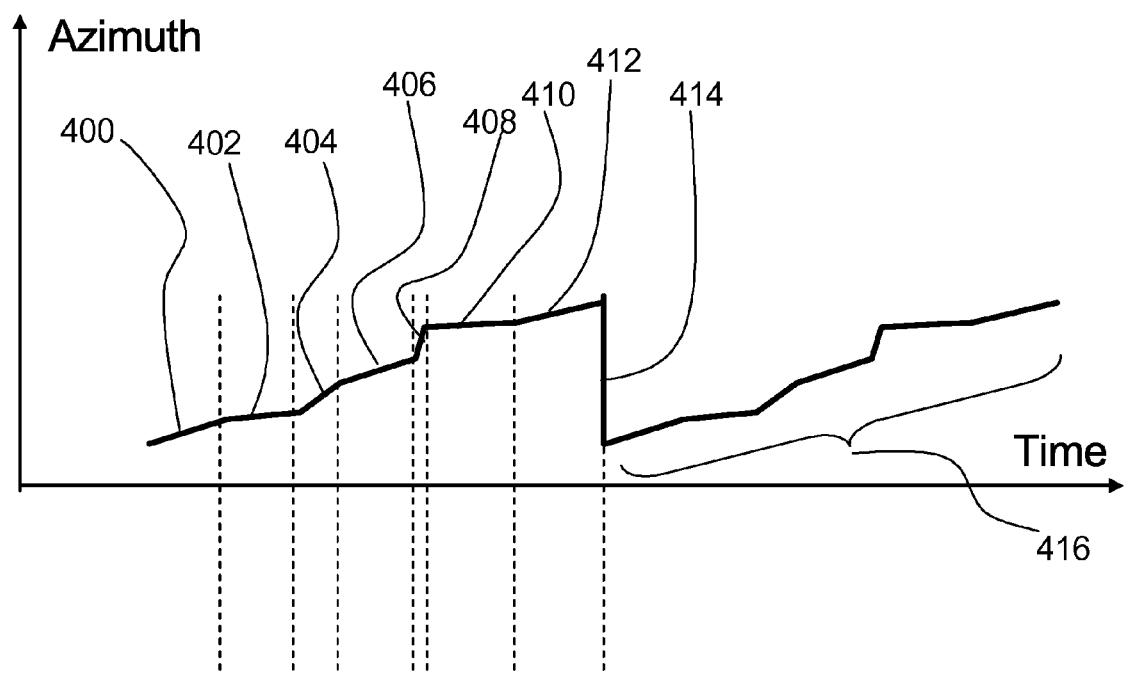

Attention is now directed to FIG. 7D. FIG. 7D shows a scanning schedule in an embodiment of the camera, where the scanning rate is modified during the scan to scan sectors of higher interest, or power light conditions, slower than other sectors. The chart shows the azimuth versus time, and shows two identical cycles of scanning. sectors 400, 406 and 416 have the same slope and are scanned at the nominal rate. Sectors 402 and 410 are scanned more slowly, spending more time on each column. Sectors 404 and 408 are scanned faster, spending less time on each column. The second cycle, 416, is identical to the first cycle. The change of speed is done by a command from the system controller to the motor of the mirror. As the shaft encoder is linked to the mirror axis, and as the lookup table addresses are linked to the shaft encoder—the system automatically adjusts itself to the changing speed.

Figures 8A, 8B:
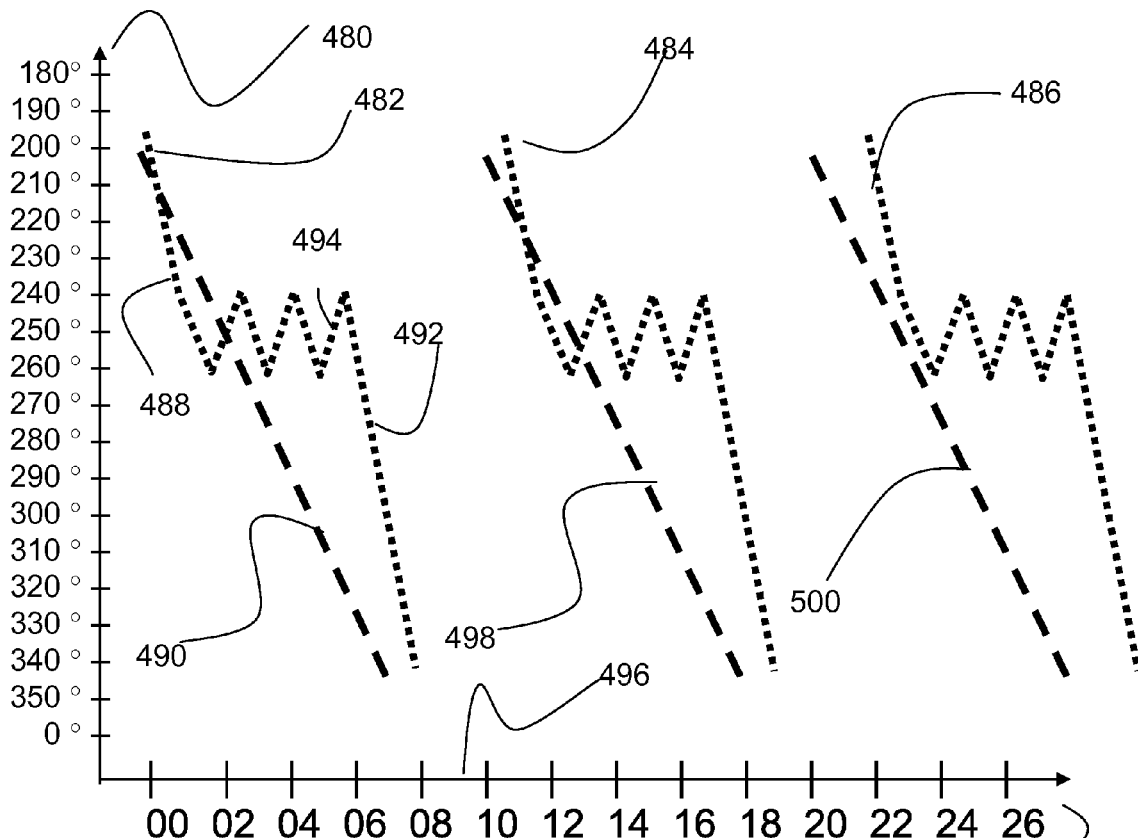
FIG. 8 show a database representation and corresponding graphs of a typical scan schedule.

Attention is now called to FIG. 8A, 8B showing a database representation of a schedule of sector scanning in one embodiment of this invention.

In FIG. 8A, a table is maintained in the system, listing the scanning parameters for controlling the motor of the mirror.

Row no. 1 shows a simple scan of a field of view of 140 degrees, from azimuth 200 (south west) to azimuth 340 (north west) in one sweep at a rate of 20 degrees per second. This sweep will take 7 seconds, will repeat as soon as the mirror can be brought again to azimuth 200 (by completing a revolution, or by sweeping back, or by being replaced by another mirror of a polygonal mirror as described in U.S. patent application Ser. No. 11/117,731).

Rows 2, 3 and 4 of the table show, together, a complex scan where the camera sweeps in 1 second from 200 to 240 at a speed of 40 degrees per second, then sector scans the sector 240-260 six times at a speed of 20 degrees per second, and finally runs to 340 at a speed of 40 degrees per second. As soon as the mirror is again available at 200, the sequence repeats itself. So, line 1 and lines 2,3,4 are two alternative scanning schedules of the same field of view, and the camera can do either of them, or alternate between them at any prescribed order.

FIG. 8B shows the azimuth 480—time 478 pattern of coverage. Patterns 490, 498 and 500 show three repetitions of row 1 of the table, where 496 indicates a "dead" time when the mirror is brought back to the starting position. 483, 484 and 486 show three cycles of the complex 2-3-4 rows scan, where 488 is row 2, 494 is one of the 6 repetition of line 3, and 492 is line 4.

The system controls the motor according to the prescription of the schedule table, and the shaft encoder and the lookup table synchronize the operation of the camera to the position of the mirror.

Attention is now drawn to FIGS. 9A-9C. In another embodiment, the camera can compensate for uneven brightness or illumination level across the field of view by adjusting the sensitivity of the CCD array and the bias and gain of the amplifiers to the apparent brightness or light level in every azimuth in the field of view. Such differences can happen if the field of view includes both an outdoor sunny scene and an indoor shaded volume—as is shown in FIG. 9A. It can also happen if part of the scene is exposed to the bright sun while other parts are heavily shaded under a tree. In an embodiment of this invention, the CCD cell parameters, such as gain and bias of every cell in the linear CCD array can be calibrated to have a uniform response across the dynamic range of the camera.

The dynamic range of each pixel in the image is finite and is determined by the number of significant bits in the digital output of the cell. As the field of view may contain very dark areas and very bright areas, the dynamic range has to be spread across a wide range of values. This means the dark areas and bright areas will have only a part of the given dynamic ranges. And that therefore, the dynamic range, and therefore the resulting information that can be derived from the image, will not be optimized for any particular area of the field of view.

In certain embodiments of the present invention dark and bright sub areas are identified and a look-up table is programmed to assign different bias and gain to these areas, and the dynamic range in these areas will be increased.

FIGS. 9A-9C show how the camera of the present invention works with locally adjusted dynamic range of the CCD cells.

FIG. 9A shows a part 190 of an image that will be used for this explanation. It shows a stone wall of a remote building and a square window 192 that contains four iron bars 194. It may be relevant to note that this image was taken from a distance of 400 meters and is about 1/10,000 of the field of view covered by the camera an a single scan. While the dynamic range of the camera is well adjusted to cover the texture of the stones, it seems that it is not good enough to distinguish between details through the dark window. It would be easier to see through the window if the dynamic range of the camera would be biased towards the dark colors by increasing the gain and lowering the bias of the signals coming out of the CCD cells.

FIG. 9B is a schematic illustration of a single "run" 196 in the lookup table. The top 198 and the bottom 199 of the run indicate the first and the last pixel in the field of view that the run covers. The gray level at the top and the gray level at the bottom of the run indicate the highest and lowest gray levels that are well covered by the dynamic range of the cells in the run. By placing the run of FIG. 9B on the image of FIG. 9A, we indicate the parameters of one run in the image: its azimuth range (meaning—the left most and right most image columns), its elevation range (meaning the first and last pixels in the column) and its dynamic range (meaning the bias and the gain of the CCD cell signal). The lookup table can be represented by a list of runs representing these parameters, with the addition of one more parameter that is not represented in this illustration—the resolution.

FIG. 9C shows some of the runs in a proper coverage of the image of FIG. 9A. The image 210 has light areas 200 and these areas are covered by runs 201 ranging between the minimum and maximum gray levels of this area. The image also has dark areas 202 and they are covered by runs 204 with a dynamic range between the minimum and maximum gray levels expected there—that are significantly darker, starting from total black. One can note that the top of the gray level scale of the dark runs 204 is approximately similar to the bottom of the gray level of the light runs 201, meaning that by adjusting the dynamic range to the image the camera of the present invention can double its dynamic range.

In one embodiment, the segmentation of the field of view to areas of different dynamic ranges can be done interactively, by the user looking at the image and segmenting it with a pointing device such as a mouse.

In another embodiment of the invention, the segmentation can be done automatically. The camera can segment the image arbitrarily into sub areas, then find the suitable dynamic range (gain and bias) for each sub-area, then merge contiguous sub-areas of a similar dynamic range into territories of a similar dynamic range, and finally slice these territories to vertical stripes and convert each stripe into a run.

In another embodiment of the invention, the segmentation can be done semi-automatically. The user can indicate a region of interest (ROI), and the camera can calculate the best gain and bias in order to optimize the dynamic range for that ROI. The camera can calculate this for example, by a histogram algorithm that fits gain and bias to the available gray levels of the image.

It should be noted that if the system is using a table compression method (for example run-length-encoding, or other method known in the art) for the dilution and also a table compression method for the dynamic range allocation, then it can, in one embodiment, use one table and segment the runs by resolution and by dynamic range, so that each segment will have its own resolution and dynamic range. In another embodiment, the system can maintain two lookup tables, one for resolution and one for dynamic range, and the system will look up both tables for each pixel. The latter embodiment is better when there is no correlation between the segmentation by resolution and the segmentation by dynamic range.

It should be noted also that the segmentation of the field of view by resolution is either constant (for example, according to areas of interest) or continuously changing (for example, when tracking targets or when a user interacts with the camera). The segmentation by dynamic range is either constant (for example, indoors with constant illumination conditions) or variable (for example, outdoors, as light conditions change).

Attention is now drawn to FIGS. 10A-10B. As described hereinabove, the camera of the present invention can adjust several parameters (such as dilution rate, offset, gain) on a pixel-by-pixel basis and on a scan-line by scan-line basis. However, it is very likely that these parameters will not have to be changed between neighboring pixels as the level of interest in the area, and the illumination conditions, are typically rather uniform in the same locality. This enables an embodiment of the invention, to save on storage space of the look up table and assign the same set of parameters to sub areas in the filed of view rather than to individual pixels.

For reasons known to any computer engineer, the most convenient shape of such areas is a rectangle, extending for a plurality of scan columns, including the same range of pixels in each line.

Different sub areas of interest may require different rectangles of parameters.

For electronic engineering convenience, the rectangles of different sub areas should not overlap.

FIGS. 10A-10B show the method of converting two overlapping rectangular windows, each having different parameters, into homogenous, non overlapping windows.

The essence of a lookup table is the ability to obtain the parameters for a given point in the image by looking up the correct entry in the table.

As the user may need several windows of resolution and the windows may be overlapping (for example: he wants to zoom on a building, and in the building he wants a much higher zoom on one window)—some cells, in the overlap area, have to comply with two different levels of dilution.

In order to simplify the processing of the system and map a single cell to a single entry in the lookup table, the camera of the present invention divides the plurality of required zoom windows, in an embodiment, into non overlapping rectangles. Each rectangle indicates a resolution that satisfies all the overlapping windows—typically the maximum required resolution.

FIG. 10A shows two overlapping windows 220 and 222.

FIG. 10B shows the way that the system will cover these two windows in the lookup table in one embodiment: two windows, 228 and 232, will be defined with the parameters of 220. Two other windows, 224 and 230, will be defined with the parameters of 222. One window 226 will be defined with parameters that satisfy both 220 and 222—typically with the higher resolution of the two.

Upon processing the data, the camera will combine the information from 232, 226 and 228 into one window, and then combine the information from 230, 226 and 224 into another window.

While the above description explains how the dilution parameters are handled in overlapping rectangles, a note has to be made about the dynamic range parameters. The dilution parameters are derived from the level of interest of the user in different areas. The dynamic range parameters (offset and gain) are derived from the brightness of the area, without a necessary dependence upon the interest of the user. An area that is in overlap between two rectangles will typically carry the same, or very close, parameters for dynamic range in both rectangles. In an embodiment of this invention, the overlapping rectangle 226 will be handled with the average of the dynamic range parameters of both overlapping rectangles.

Figure 11:
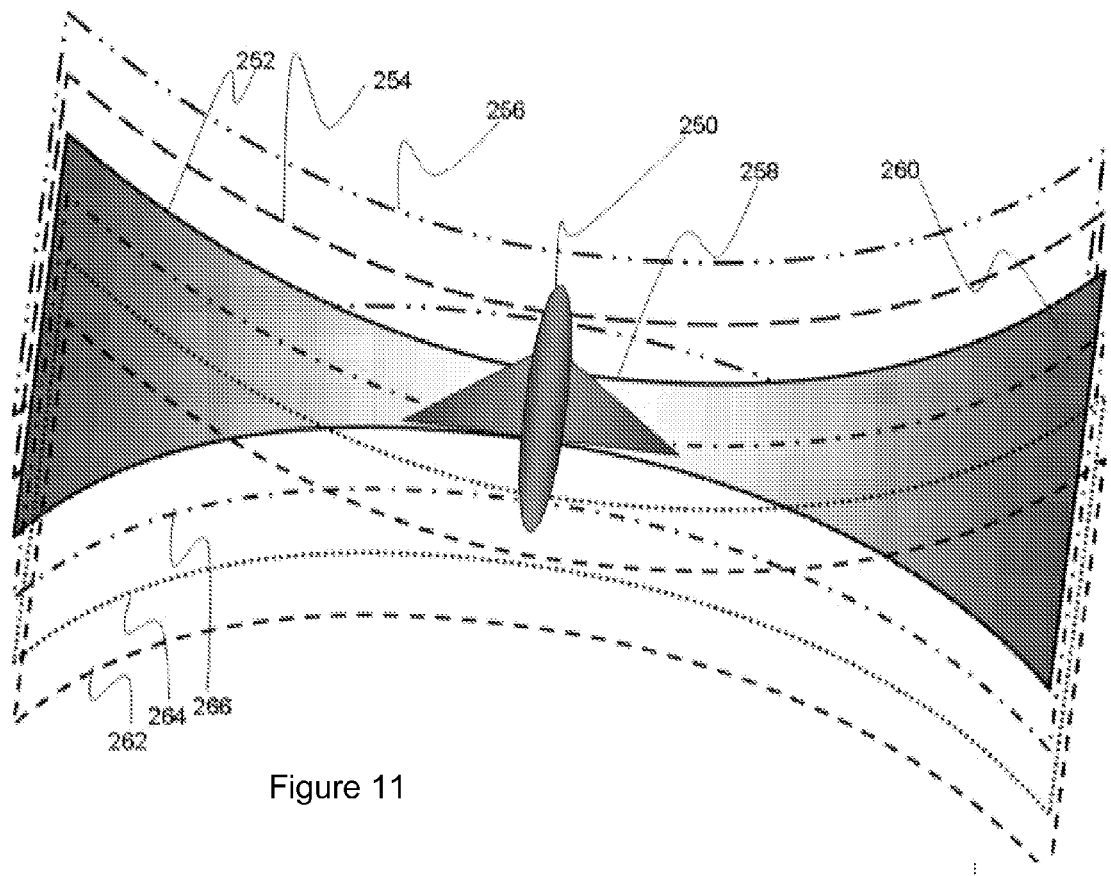
FIG. 11 illustrates the coverage of a ground scene by the invented camera when mounted on an airborne platform.

Attention is now drawn to FIG. 11. When the camera of the present invention is mounted on an airborne platform flying in the X direction and scans the ground, the system can cover an area by covering a swathe that is very wide (in the Y direction) and short (in the X direction). The X dimension is then covered by the motion of the platform. This can be done with the camera of the present invention as the camera can cover a very narrow field of view. In the case of a moving airborne platform, the camera can be positioned with an angle of rotation parallel to the direction of flight.

FIG. 11 shows how the camera of the present invention, when installed in an airborne platform such as an airplane or UAV, can cover a wide area under the platform.

A platform 250 carries the camera of the present invention, looking downwards with the axis of rotation of the mirror pointing in the direction of flight.

The camera scans a very wide field of view, typically 140 degrees, covering the ground from very far on the left side to very far on the right side.

As the distance to the ground from the camera increases towards the left and right edges of the image, the area covered by each scan has the concave shape illustrated as the shaded area 258, where the darker areas represent lower resolution due to larger distance.

The camera can adjust the dilution, using the lookup table, to compensate for the scale and distance of the target, using methods that were described in detail in U.S. patent application Ser. No. 11/117,731—to the extent of obtaining uniform scale and resolution at all ranges. This can be done by using the whole CCD length with low density of pixels at the center of the field of view, directly below the platform, and gradually reducing the used portion of the CCD, while increasing the density of pixels, towards the ends of the scanned area—towards the left and right horizons.

As the platform is moving in the direction of the narrow dimension of the image, it creates contiguous, partially overlapping images—262, 264, 266 are earlier than 258, and 254, 256 are later than 258. This continuum of partially overlapping, uniform resolution images can be stitched to a uniform, close to orthogonal image that can be very useful for ground surveillance.

Figure 12:
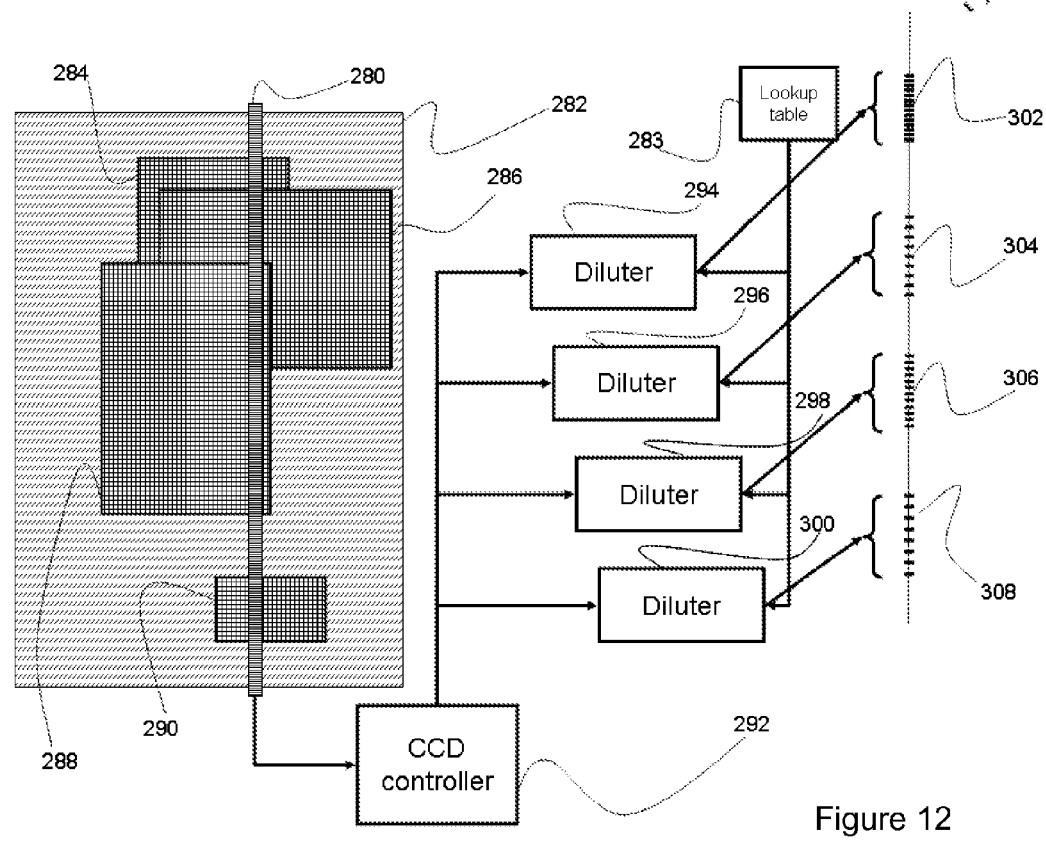
FIG. 12 illustrates the parallel operation of several dilution units.

Attention is now drawn to FIG. 12. There can be situations where several zoom windows are defined in the same azimuth. When this happens, and each zoom window has its own dilution formula, the diluting module that is capable of diluting the CCD output in accordance with the prescribed resolution for a given window, has to work sequentially on each zoom window. This will make the diluting module a processing bottleneck. The present invention teaches that the camera can have several diluting modules, fed by the raw CCD output in parallel, each diluting for one zoom window.

FIG. 12 shows multiple dilution units in an embodiment of the present invention.

A field of view 282 is covered by a camera, and has four zoom windows 284, 286, 288 and 290 some of which are overlapping.

A linear CCD array 280 is covering the field of view, and its raw output is "milked" sequentially via a controller 292.

In the overlapping areas, different dilution definitions apply to the same area of the CCD. When the dilution is done by a hardware component, the component may not be capable of generating the outputs for different overlapping windows at the same time.

In one embodiment of the invention, the raw output of the CCD array is split between several hardware dilutors 294, 296, 298, 300, each is responsible for one window, applying the formula of dilution directed by the lookup table 283 of that window. The result is a set of windows, represented here as 302, 304, 306, 308—each having a potentially different resolution as dictated by the relevant dilution formulae.

Attention is now drawn to FIGS. 13A-13E. When using a strong light source to illuminate the target, it is desirable to optically isolate the light source from the sensitive CCD, in order not to blind it. The present invention, in one embodiment, separates the light source and the camera into two separate packages that are optically isolated from each other—each having a rotating mirror, one reflecting a line of the field of view (the "imaging blade") into the camera, and the other reflecting the light beam (the "illumination blade") onto the field of view.

As both the imaging blade and the illumination blade are extremely narrow, there must be a good tracking mechanism to ensure that they will point at the same direction.

In one preferable embodiment, the two blades are coming from the same direction, and the two packages are positioned above each other.

In this embodiment, the two mirrors can be rotating about a single axis, or about two separate axii that are mechanically linked to each other.

In another embodiment, the two mirrors rotate on two separate rotating mechanisms, and the tracking between them is electronic.

In both embodiments, the tracking between the two blades is done in a close loop, providing an error message that adjusts the speed and the phase of the two mirrors to ensure an overlap of the two blades.

Figures 13A, 13B, 13C, 13D, 13E:
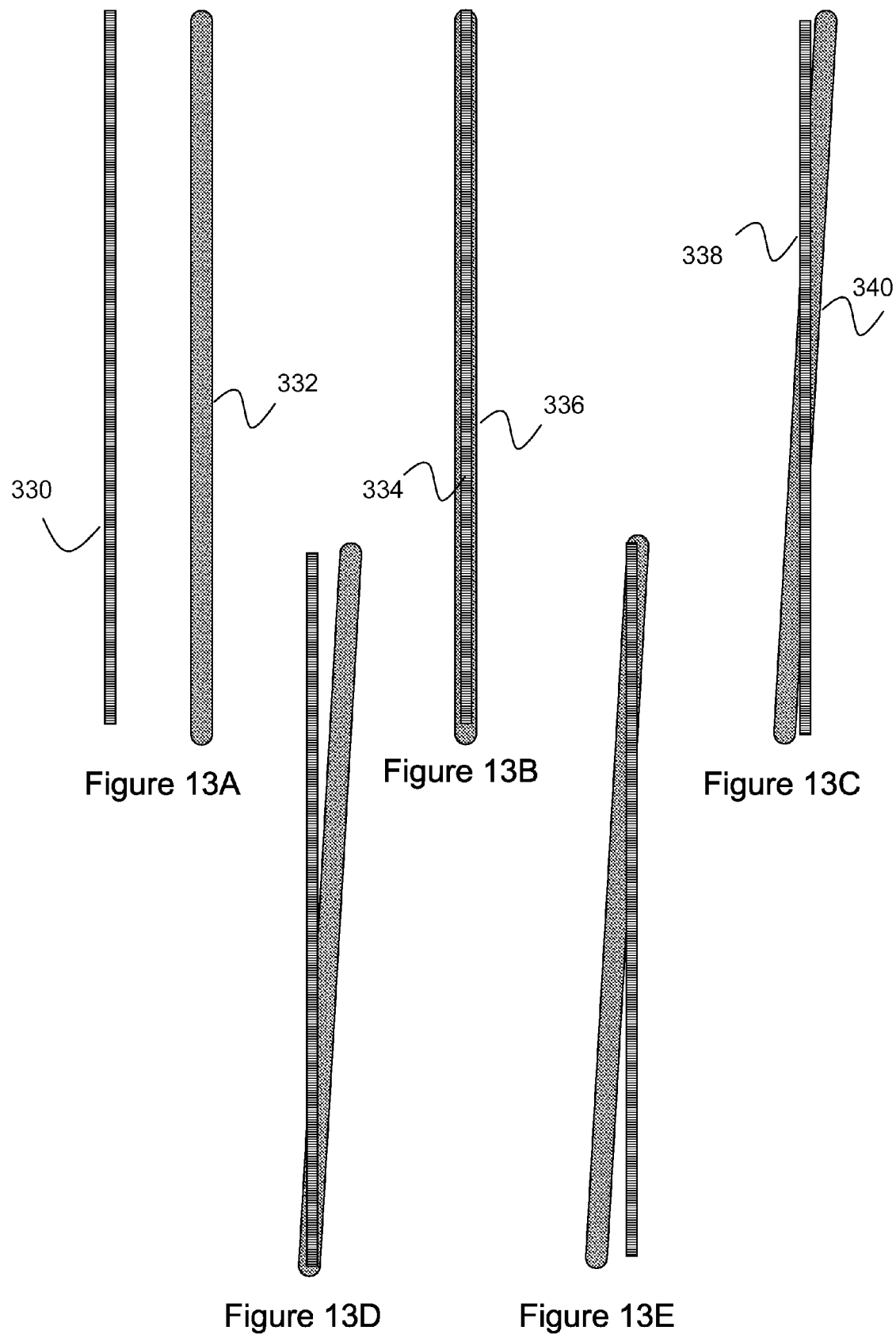
FIG. 13 illustrate tracking between the illumination blade and the imaging blade.

FIG. 13A-13E show the tracking of the illumination blade and the imaging blade, in one embodiment of the invention. FIG. 13A shows a front view of an imaging blade 330 and an illumination blade 332. FIG. 13B shows the optimal orientation of the two blades, overlapping each other, where 334 is the imaging blade and the 336 is the illumination blade. FIG. 13C3E show how an error signal for aligning the two mirrors is generated by slanting the illumination blade 340, while the imaging blade 338 is vertical. In processing the image, the system seeks dark horizontal stripes along the top and at the bottom of the image.

The angle of slanting of the light blade is small enough to ensure that when the two blades are aligned to the same direction (as in 13C), the full imaging blade is covered by light from the light blade, and the image is evenly illuminated. However, a deviation of angle between the two blades will cause the top (in FIG. 13D) or the bottom (in FIG. 13E) of the imaging blade to slide out of the illumination blade, and the image will appear to be darker at the top or the bottom. By monitoring the bottom stripe and the top stripe of the image, the system can detect this mis-alignment between the two blades, and issue an error correction signal to correct the misalignment. Continuous correction of the misalignment will ensure that the two blades stay aligned.

Attention is now drawn to FIGS. 14A-14E. FIG. 14 shows how an illumination blade can be generated from a narrow, circular laser beam.

The illumination blade is preferably very narrow—slightly wider than the image blade, that is typically few tens of microradians. In one embodiment of the present invention, the source of light is a laser beam, which typically has a round cross section 350. The beam, in one embodiment of the invention, is divided to vertical sub-beams, as marked in 350. FIG. 14B shows a side view of a beam that is split to sub beams. The round beam 352 is projected on a set of narrow mirrors 355, all within the width of the beam, that are slanted vertically at different angles. A part of the laser beam is reflected 354 from each of the mirrors at a different angle. Each bean has the vertical width of the original beam, and the horizontal width much smaller than the original beam. The sub beams are seen from the front in FIG. 14C, creating together a narrow and tall beam. FIG. 14D shows a configuration that deals with the situation that the vertical span of each segment is extremely narrow and the individual segments may not cover the vertical sector continuously. In this figure, the mirrors 358 are slightly convex in the vertical plane. Each segment becomes a small vertical sector 360. The sectors can slightly overlap and create a continuous vertical narrow beam.

FIG. 14E shows a way to manufacture and maintain such set of mirrors. A set of polished and narrow plates that are polished to become mirrors on their left sides, 364, are attached to each other side by side, while being rotated slightly one towards the other, as indicated by 366. the plates are then fastened together by adhesive or by clamping. When bonded, the block can be polished from the bottom to have a common base surface along line 372 and optionally from the top to have a common top surface along the line 370. The result is a solid block that can reflect a narrow laser beam as a fanned out, very narrow sector beam.

Alternately, the beam can be converted to a narrow vertical blade by a cylindrical lens pair, or a fiber optics beam shaper bundle or other means of beam shaping.

The extreme resolution of the camera of the present invention can cause the dot size of the lens to be larger than the pixel of the CCD. This makes the resolution of the camera dependent upon the lens more than upon the CCD array. In order to increase the resolution of the camera, the dot size of the lens has to be reduced. In an embodiment of this invention, some chromatic blurring caused by the non uniformity of the lens at different wavelengths, is reduced by placing a chromatic filter in the optical path. This method, together with improving the quality of the lens itself, help the lens in the camera of the present invention to match the high resolution of the CCD. (No figure)

In an embodiment of this invention, the camera uses the sun as an angular calibration beacon to orient itself in azimuth and elevation. When powered up and running, the camera sets itself to a minimum sensitivity and covers a field of regard that includes the sun, the moon or any other distinct source of light with a very small angular size. The angular size of the sun is 0.5 degree, and so is the angular size of the moon. The system knows, from astronomy databases—such as given by the SunPo program, described by Paul J. Camp, Assistant Professor of Physics Coastal Carolina University Conway, S.C. and mentioned in http://lists.nau.edu/cgibin. By using the true azimuth and elevation of the sun as reference, the camera can calibrate itself and provide a very precise azimuth and elevation for any object in the field of view.

Attention is now called to FIGS. 15A-15D. In one embodiment of the present invention, the scanning of the field of view is done by interlacing two or more scans. An N-level interlacing is done by skipping N−1 columns when sampling the CCD, and starting each scan one column later than the previous scan, until all columns have been sampled, and then starting over, in the next scan, from the first column.

This interlacing serves three purposes: It allows longer integration time for the CCD cells, thus increasing the sensitivity, it reduces the load on the analog to digital converter, enabling longer time for sampling each column, and it provides a clear and unambiguous indication of mobbing targets. Following is an explanation of the third purpose:

Practically, every point target in the field of view has a diagonal component in it (meaning—moving both in azimuth and in elevation). If the camera would not be interlacing (would sample the selected columns by their order, from the beginning to the end of the field of view), the trajectory of the point in the image would appear to be a smooth, diagonal line. The slope of the line in the image will be a function of the actual trajectory of the target in space, and of the angular velocity of the target in respect to the camera—as was explained in FIGS. 5 and 6.

However, if the camera is interlacing and the point is being sampled in a non-monotonous order, the trajectory of the target in the image will be slightly jagged. If the target point is a part of the contour of a moving object, this contour will be jagged, and therefore the moving object will be clearly distinguished from stationary objects.

This will be better understood from FIG. 15, showing the effect of interlacing on the shape of a moving object. FIG. 15A shows an object 280 in the field of view of the camera. FIG. 15B shows the appearance of the object 382 to the camera that is sampling it along lines 384 at a constant rate while scanning the object from left to right. Clearly, the sampled object appears to the camera very similar to its real appearance.

Figure 15A:
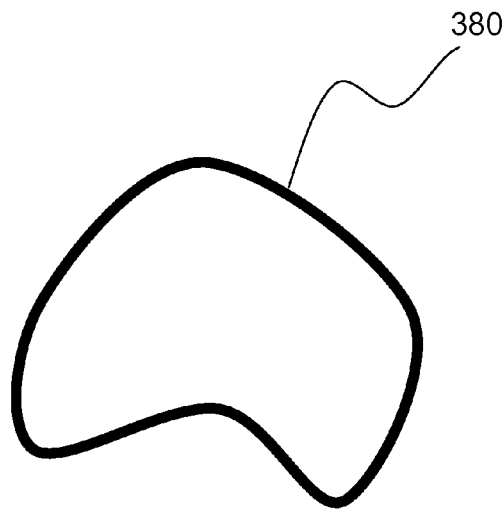
FIG. 15 illustrate the effect of interlacing on the jaggedness of objects in the image.
Figure 15B:
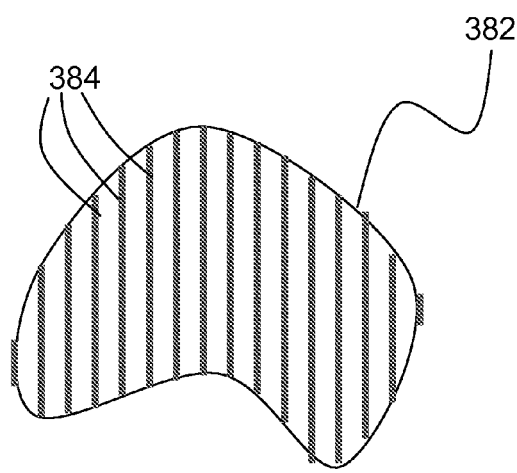
Figure 15C:
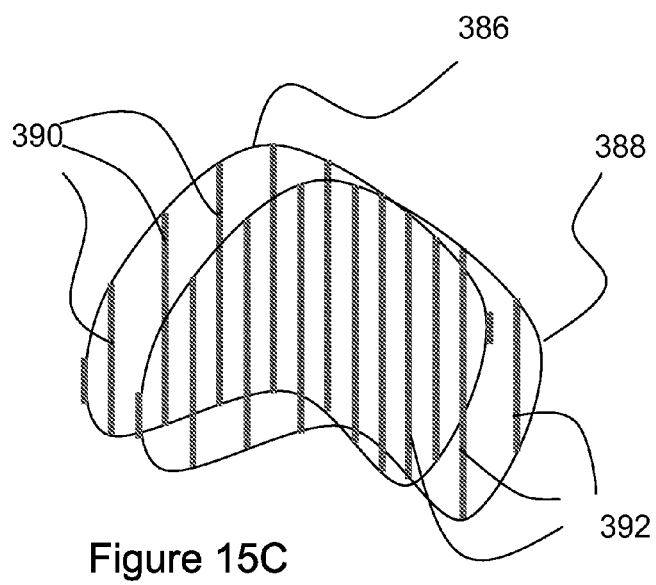
Figure 15D:
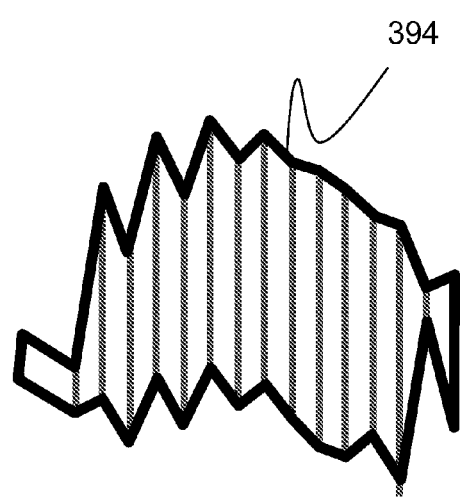

FIG. 15C shows the object in motion under two passes of the interlacing scan. The first interlacing scan finds the object 386, and samples it along lines 390 (at a lower density than in the non-interlacing scan of 15B). The second interlacing scan finds the object 388 in a new position, and samples it along lines 392. FIG. 15D shows the scan lines interlaced to restore the original density. Due to the motion of the object between the scans, the contour of the object appears to be jagged. Clearly, if the object would not have moved between the two scans, the appearance would have been smooth as in FIG. 15B. The pitch of the jagging in terms of scan lines per period is only a function of the interlacing and not a function of the speed or direction of motion—and therefore the jagged objects can easily be detected using simple image processing. The amplitude of the jagging is a function of the horizontal component of the angular velocity of the object, and therefore can serve as an indication of the speed and consistency of the motion. This phenomenon of jagging due to interlacing is typical to any interlacing-scanning camera and is known in the art, but the extreme angular resolution of the camera of the present invention enables this jagging to be notices, measured and serve operational calculations (for determining the speed) and smoothened (to restore the original shape of the object and improve the resolution its appearance).

Figure 16A:
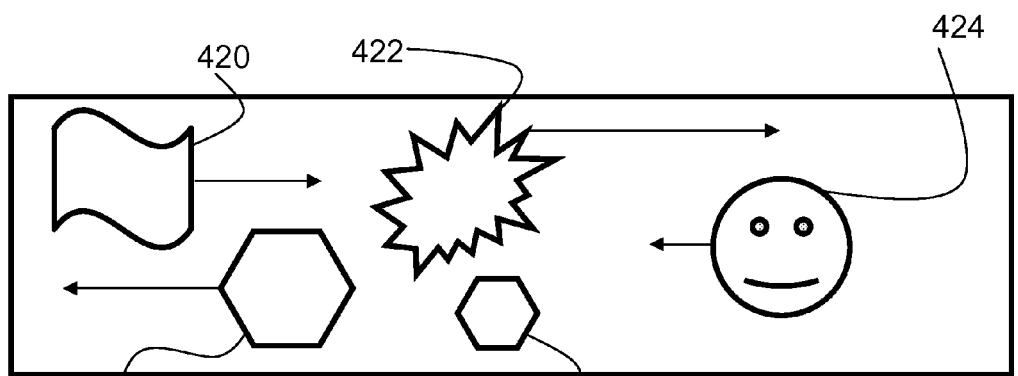
FIG. 16 illustrate the use of two opposite direction scans for correction of image distortion.

Attention is now called to FIG. 16A-16D, showing how two scanning cameras of the present invention, scanning the same field of view in opposite directions, handle moving targets by both correcting their distortion and measuring their azimuthal speed. FIG. 16A shows a field of view with 5 objects some of which are in motion. Small vectors show the direction and speed of motion of each object. Object 420 moves to the right at a certain speed. Object 422 moves to the right at a higher speed. Object 424 moves to the left at a small speed. Object 426 moves to the left at a higher speed. Object 428 does not move.

Figure 16B:
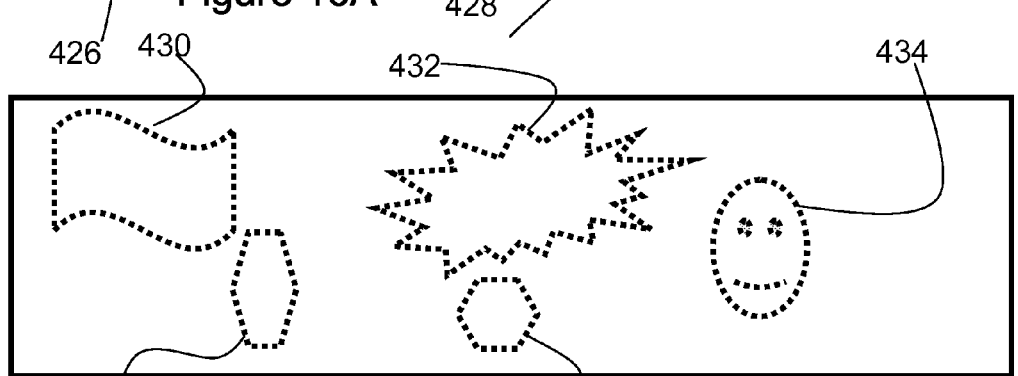

FIG. 16B shows, in dotted lines, the image that will be seen by a scanning camera that scans from left to right. All of the objects are left aligned with their originals—object 430 is left-aligned with object 420 etc. But the width of the object in the image depends on the direction and angular velocity of its motion. Object 430 is slightly wider than 420. 432 is much wider than 422. 434 is slightly narrower than 424. 436 is much narrower than 426. 438 is identical to 428.

Figure 16C:
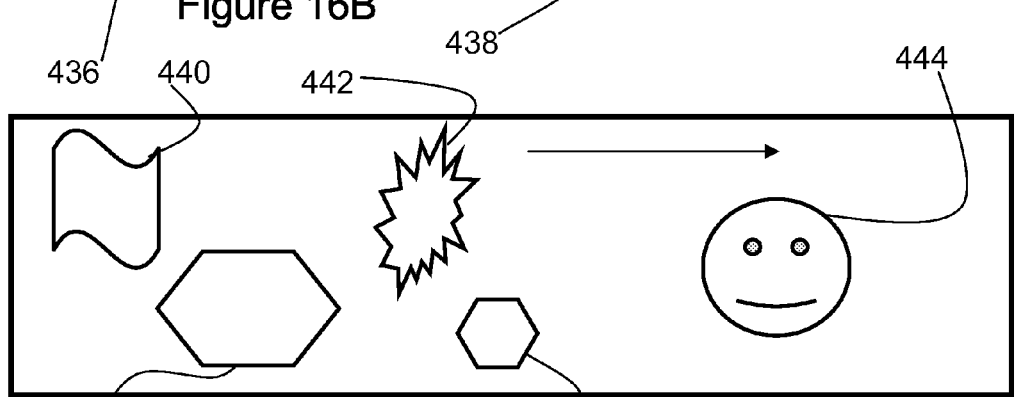

FIG. 16C shows, in solid lines, the image that will be seen by a scanning camera that scans from right to left. All of the objects are right aligned with their originals—object 440 is right-aligned with object 420 etc. But the width of the object in the image depends on the direction and angular velocity of its motion. Object 440 is slightly narrower than 420. 442 is much narrower than 422. 444 is slightly wider than 424. 446 is much wider than 426. 448 is identical to 428.

Figure 16D:
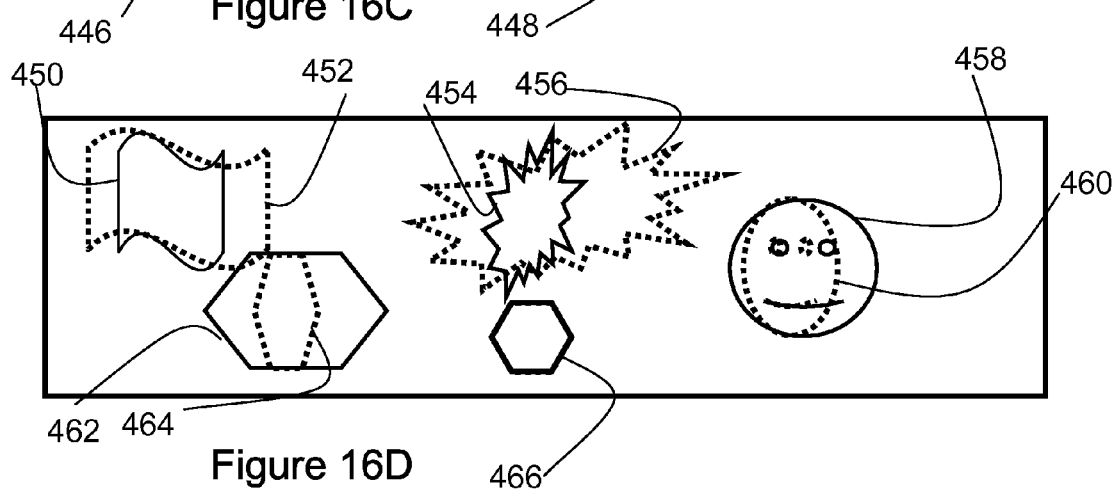

FIG. 16D shows a superimposing of the left and right scans. The dotted objects are the right scan and the solid objects are the left scan. As can clearly be seen, the differences in width between the objects is an indication of the velocity and direction of the object. Objects that are wider in dotted lines (452, 456) are moving to the right. Objects with wider solid lines (460, 462) are moving to the left. Objects that fully overlap (466) are stationary. Pairs with big difference (454-456) are moving fast. Objects with small difference (458-460) are moving slowly.

By applying morphing methods well known in the art of computer graphics, the pairs of objects can be morphed to the average of the two distorted images. This calls for edge detection, detection of key points within the edges, pairing the key points and applying averaging morphing.

The present invention enables, by applying two opposite scans, accommodation for moving targets. It should be noted that while this explanation focused on horizontal motion, the method described here is not limited to horizontal motion, and can deal with diagonal motion.

Figure 17A:
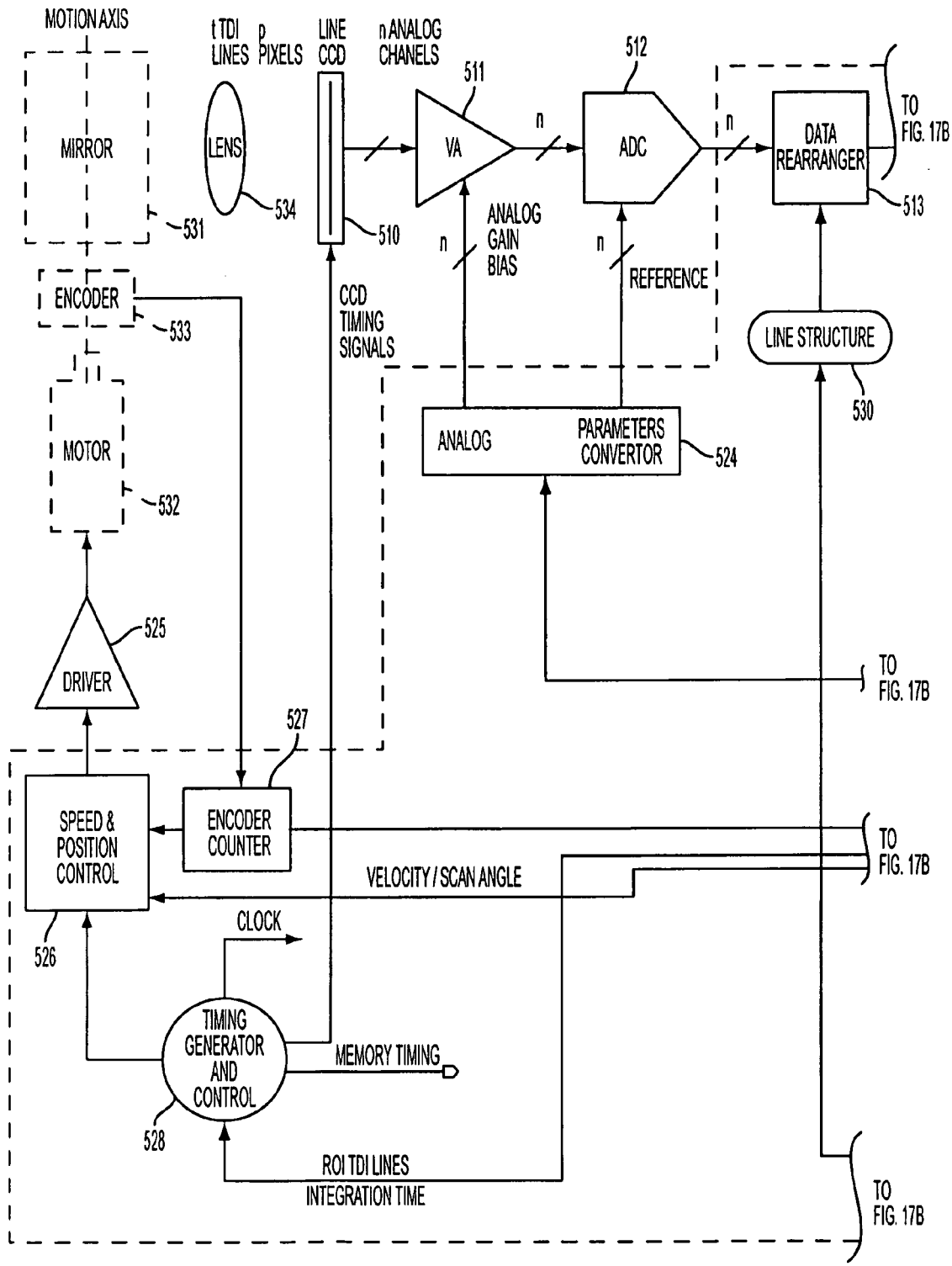
FIGS. 17A and 17B are detailed block diagrams of an image acquisition system according to one embodiment of the invention.
Figure 17B:
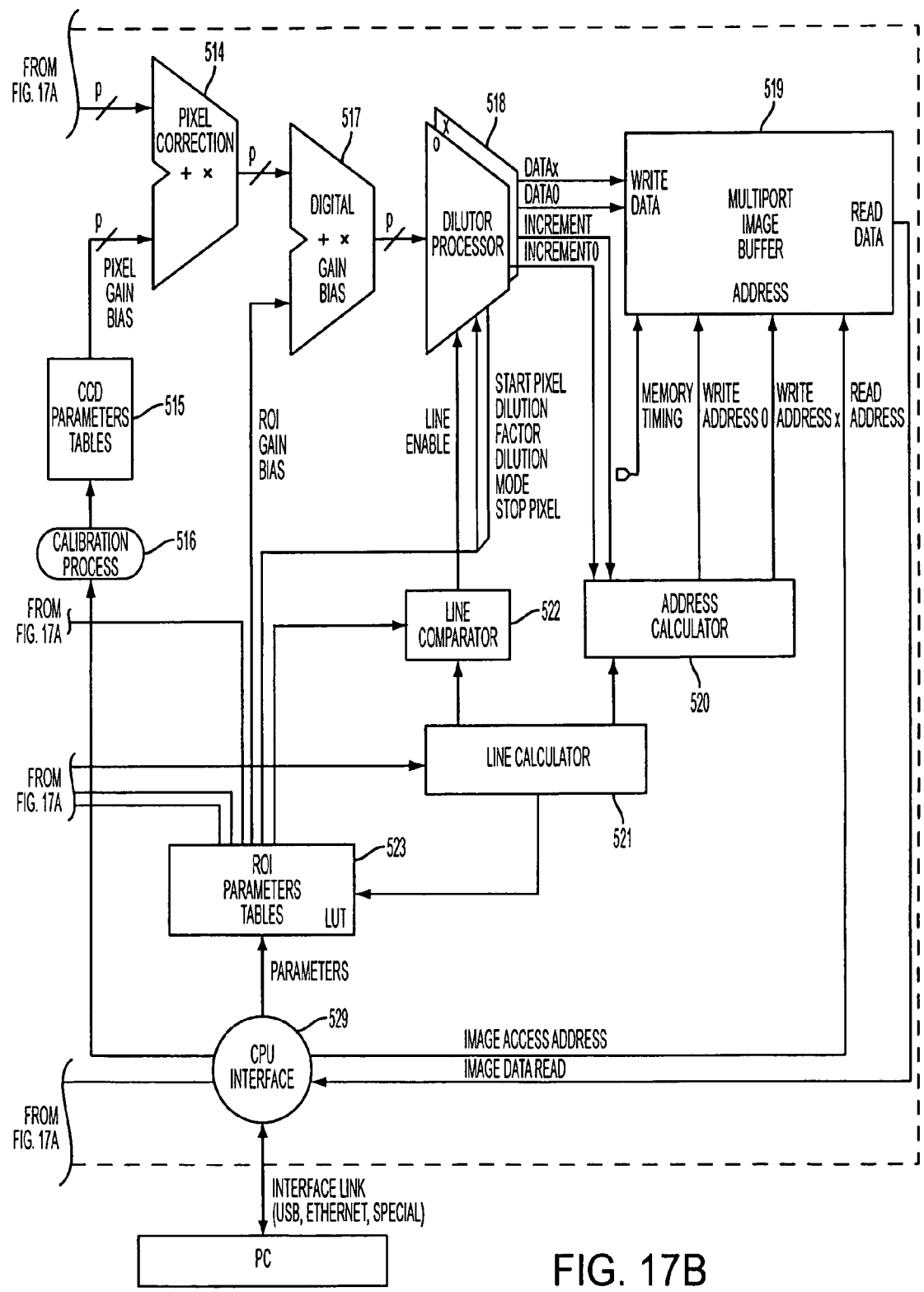

Attention is now called to FIG. 17, which is a block diagram of one embodiment of a camera according to the present invention. The block diagram will be explained by describing its blocks, using the reference numbers:

510—Line CCD—a linear imaging sensor with "p" elements (along the CCD line), whose output signals are fed through "n" output channels, each element having "t" time-delay integration (TDI) stages (across the CCD). The values "p", "n" and "t" will be used, with these meanings, throughout the description of FIG. 17. At given times during scanning, as commanded from Control 528, signals are extracted, or read out, from the CCD array, through the various output channels, collectively forming one image line (to be referred to also as "line").

511—VA: an array of "n" Video Amplifiers, with Gain and Bias control, each connected to a respective output channel of the CCD. Bias and gain values are fed from the Look Up Table (LUT—block 523), through the Analog Parameters Adapter (Block 524); These values are typically set to compensate for any inherent differences in level and gain between the various signal channels.

512—ADC: an array of Analog to Digital converters (ADC's). The number of ADC's depends on their speed. There can be one ADC per channel or, if each ADC has sufficient bandwidth to handle "m" channels—"n/m" ADC's, converting "m" signal channels each. The ADC reference voltage can be controlled by the system to adjust the Dynamic Range according to parameters received from the LUT. The output from the ADC's is "n" or "n/m" streams of digital data (pixels).

513—Data Rearranger: this block receives the "n" or "n/m" channels and arranges the pixels in a single continuous sequence, as if they were received from a single very fast video output. To accomplish this, the block uses CCD definitions (Pixels per channel and their sequencing) read from Block 530. It should be noted that since Block 513 is implemented in an Application Specific Integrated Circuit, (ASIC), the speed is now sufficient to handle the data stream in a single channel.

514—CCD Correction: This block corrects each pixel's Gain and Bias in order to compensate for any inherent difference between sensor cells. This is important in the present invention as we seek to utilize the whole available Dynamic Range, at low and high light levels and in short and long integration times. At low light levels and short integration times, the differences between adjacent cells become more noticeable.

515—The CCD Parameters Table holds the cell by cell Gain and Bias calibration data.

516—The Calibration process, for equalizing the performance of the CCD cells, may be done with the camera (as described above), to replace or update CCD calibration data obtained from the factory.

517—ROI Gain and Bias Block adjusts pixel values, per correction values obtained from Block 523 (LUT) for a current region of interest, so as to allow for brightness—and contrast variations among the various ROIs.

518—The Dilutor Processors Array selects which pixels are going to be saved to the Image Buffer and which discarded, or integrated into neighboring saved ones, according to the Dilution parameters received from the Lookup Table (LUT 523). It either discards a complete line of pixels or, for an accepted line, selects amongst its pixels. The Dilution parameters may include:

Dilution Factor—the density of pixels in this line that results from the dilution Dilution Mode—the method of selecting one pixel to represent several adjacent ones; this method may include, for example, decimation or averaging or using other filters.

It should be noted that simple table-compression algorithms can be used, depending on the application and system requirements. For example, if the dilution parameters apply to a segment of consecutive pixels within a given line, the starting and ending pixels of the segment can be communicated to the Dilutor, which will then treat all pixels within that range accordingly.

It should also be noted, that there may be multiple dilutors within the array—to enable parallel processing of multiple Regions of Interest or simultaneous coverage of a wide panoramic background and one or more narrow regions of interest. It should also be noted that more than one segment of any line can be selected and incorporated into the image by a single dilutor—simply by adding additional parameters frames for a given line position in the Look up Table.

519—The Multi-port Image Buffer is a Random Access Memory (RAM) with one write port for each dilutor and a single read port for interface with any CPU (such as a PC).

520—The Address Calculator generates the addresses for each Dilutor, according to the dilution prescription and the current line.

521—The Line calculator holds the current line count for the address calculator, the Line comparator, and the lookup table.

522—The Line Comparator enables or disables the current line for the dilutors in accordance with the lookup table parameter "Line Active" and the current line from the Line Calculator.

523—The Lookup Table holds all the parameters for the field of view, which are feedable to the various blocks as explained elsewhere herein. The parameters may include the following:

Dilution factor
Dilution mode (decimation/accumulation)
Analog Gain
Analog Bias
Digital Gain Multiplier
Digital Bias Subtract
Integration time
Motor target velocity
TDI lines used per sampled line (e.g. for the standard device is 1 to 96)
Filter (we may decide to make edge enhancement, or any other filter type in the future)

Depending on the application the Look Up Table may be organized by lines or by pixels, or Region of Interest or any other structure. In addition, depending on the application and system requirements, some or all of these parameters may be compressed using standard table compression algorithms such as "Run length encoding" or similar approaches.

524—The Analog Parameters Converter receives from the lookup table the analog Gain and Bias parameters for any pixels that are indicated for selection in the current scan line, and converts them to the format required for the analog FEE (Front End Electronics). It provides cell/channel back formatting (in opposite fashion to the Data Rearranger) and digital-to-analog conversion.

525—The Motor Driver, generates the analog power as required to drive the motor.

526—The Speed and Position Control, controls the scanning motion according to the parameters stored in the Lookup Table for the current area and according to the current position and speed.

527—The Encoder Counter reports the current position and speed to the Speed and Position Control block 526 and to the Line Calculator 521.

528—The Timing Generator and Control generates all the clocks and signals for the CCD, for the Memory (and for the DRAM controller) and for all the blocks. In particular, it generates CCD readout commands and control scan ranges and velocities according to the respective Lookup Table parameters.

529—The CPU interface links between the camera and any CPU —possibly, through a communication link, at a remote station.

530—Line Structure: is the definition of the order of cells-vs.-channels arrangement in the CCD

531—Mirror: placed between in front of the lens to scan the image of the scene into the CCD.

532—Motor: moves the encoder and the mirror, while the encoder and the mirror must be attached to the same axis for precision, the motor motion can be transferred to the mirror in a variety of ways—for example, through a common axis or by a pulley and belt, gears etc. In continuously monotonic rotating applications the motor power can be low, and the attachment can be done by elastic belts to avoid mechanical noise to be transferred to the mirror. If the system has to sustain a bi-directional sector scan, where high accelerations are expected, the motor power is designed to be higher—to accommodate the acceleration, and transmission between the motor and the mirror axis is designed to be rigid.

533—Encoder: detects the current mirror orientation and hence—the current azimuth position of the scan line. The practical encoder pulse can be an interpolated signal between two physical encoder pulses, and known speed of the motion and the time passed from the previous measure are used for interpolation of the precise position of the mirror. This calculation is typically performed on the encoder counter.

534—Lens: Placed between the mirror and the CCD, the lens projects the scene, as scanned by the mirror, onto the CCD line. When the target is at a long distance from the camera, compared with the focal length of the lens, the focusing is adjusted to infinity (Typically 200 meters to 2000 meters is considered "long range" with a 400 mm focal length lens). When the target is at a closer range, the focus will be done to the longest distance in the range and the short range focus is handled on a method that is described in U.S. patent application Ser. No. 11/117,731.

While the invention has been particularly shown and described with reference to one embodiment thereof, it will be understood by those skilled in the art that various changes in form and details may be made therein without departing from the spirit and scope of the invention.

The invention claimed is:

1. A digital camera comprising:
    at least one sensor adapted to provide a digital representation of a portion of a field of view;
    an optical system causing a plurality of locations within the field of view to become incident on the at least one sensor;
    a lookup table, operative to store a plurality of sets of values, each set related to a rectangular region of interest within the field of view, the stored values including values for scanning velocity and time between signal extraction, bias and gain factors, and pixel dilution parameters;
    a timing generator and controller, operative to cause the plurality of locations within the field of view to become incident on the at least one sensor at a given velocity and to command video signal extraction from the at least one sensor at a given time, the values for scanning velocity and time between signal extraction being obtained from the lookup table;
    a pixel correction module, operative to add a bias factor to any pixel within the digital representation of the portion of a field of view and to further multiply the pixel by a gain factor, the values for bias and gain factors being obtained from the look-up table;
    one or more dilutor modules, each operative to select or combine pixels within the digital representation of the portion of a field of view to form a diluted digital image representation, the parameters for pixel dilution being obtained from the from the look-up table.

2. The digital camera of claim 1 wherein the camera is configured such that the lookup table can be modified.

3. The digital camera of claim 1 wherein bias and gain values are automatically calibrated by comparing values of adjacent pixels within a plurality of locations within the field of view under a plurality of lighting conditions.

4. The digital camera of claim 1 wherein the sensitivity of the at least one sensor can be varied for different locations within the field of view.

5. The digital camera of claim 1 wherein reference voltage values are used to correct for differences in bias and gain between sensors.

6. The digital camera of claim 1 wherein the camera is configured such that the lookup table can be modified by a general purpose computer external to the digital camera.

7. The digital camera of claim 1 further comprising a light projector for casting an illumination on a location within the field of view as it becomes incident on the at least one sensor.

8. A digital camera comprising:
    a linear array of electro-optical sensor cells;
    an opto-mechanical scanner, operative to scan an optical image of the scene across the array;
    one or more amplifiers, each receptive to a corresponding signal extracted from the array;
    one or more analog-to-digital converters, each receptive to signals from corresponding one or more of the amplifiers and outputting corresponding pixels;
    a digital region-of-interest look-up table (ROI LUT), operative to store a plurality of sets of values, each set related to a rectangular region of interest within the image, the stored values including scan parameters, time between signal extractions (TBSE), bias and gain factors, and pixel dilution parameters;
    one or more dilutor modules, each operative to select or combine any given ones of the pixels according to corresponding dilution parameters obtained from the ROI LUT, to form a diluted digital image representation;
    a timing generator and controller (TGC), operative to effect scanning in a given velocity and to command video signal extraction from the sensor array at given times, all given values being obtained from the ROI LUT for the current scan position
    a pixel correction module, operative to add a bias value to any pixel and to multiply it by a gain factor, the bias value and the gain factor being obtained from data in the ROI LUT related to a region of interest that includes a point corresponding to that pixel.

9. A method of acquiring a digital image, the method comprising the steps of:
- providing a linear array of a plurality of electro-optical sensor cells, disposed along a first coordinate axis;
- scanning an optical image of the scene across the array along a second coordinate axis, orthogonal to the first;
- storing a plurality of sets of values, each set related to a corresponding rectangular region within the image, the stored values including digital gain, digital bias, scan velocity, time between signal extractions and pixel dilution parameters;
- extracting electrical signals from the sensors array, the time of each extraction being determined by the corresponding time between signal extractions value;
- amplifying the signals and converting them to digital representations, structured as pixels;
- adding to each pixel a given bias and multiplying it by a given gain, the gain and the bias being determined by the corresponding stored gain and bias values;
- diluting pixels according to stored dilution parameters, to form a diluted digital image representation.

10. The method of claim 9, further comprising a light projector for casting an illumination line upon a portion of the field of view as it becomes incident on the linear array.

11. A digital camera comprising:
- at least one sensor adapted to provide a digital representation of a portion of a field of view;
- an optical system causing a plurality of locations within the field of view to become incident on the at least one sensor;
- a pixel correction module, operative to add a bias value to any pixel within the digital representation of a portion of a field of view and to multiply it by a gain factor.

12. The digital camera of claim 11, further comprising:
- a lookup table, operative to store a plurality of sets of values, each set related to a rectangular region of interest within the field of view, the stored values including bias and gain factors, wherein the bias and gain factors used by the pixel correction module are obtained from the lookup table.

13. The digital camera of claim 11, further comprising:
- a timing generator and controller, operative to cause the plurality of locations within the field of view to become incident on the at least one sensor at a given velocity and to command video signal extraction from the at least one sensor at a given time.

14. The digital camera of claim 13, further comprising:
- a lookup table, operative to store a plurality of sets of values, each set related to a rectangular region of interest within the field of view, the stored values including values for scanning velocity and time between signal extraction, wherein the scanning velocity and time between signal extraction of the timing generator and controller are determined by values in the look-up table.

15. The digital camera of claim 11, further comprising:
- one or more dilutor modules, each operative to select or combine pixels within the digital representation of a portion of a field of view to form a diluted digital image representation.

16. The digital camera of claim 15, further comprising:
- a lookup table, operative to store a plurality of sets of values, each set related to a rectangular region of interest within the field of view, the stored values including values for dilution of pixels, wherein the one or more dilutor modules use the stored values for dilution of pixels to form the diluted digital image representation.

17. A method of acquiring a digital image, the method comprising the steps of:
- providing a linear array of a plurality of electro-optical sensor cells;
- scanning an optical image of the scene across the array, causing the array to provide a digital representation for each of the electro-optical sensor cells;
- storing a plurality of sets of values, each set related to a corresponding rectangular region within the image, the stored values including digital gain, digital bias, scan velocity, time between signal extractions and pixel dilution parameters;
- adding to each digital representation a given bias and multiplying it by a given gain, the gain and the bias being determined by the corresponding stored gain and bias values.

18. The method of acquiring a digital image according to claim 17, wherein said step of storing a plurality of sets of values comprises storing said plurality of sets of values in a lookup table.

* * * * *